(12) United States Patent
Son et al.

(10) Patent No.: US 8,274,213 B2
(45) Date of Patent: Sep. 25, 2012

(54) ELECTROCHROMIC MATERIALS AND ELECTROCHROMIC DEVICES USING THE SAME

(75) Inventors: Seung Uk Son, Suwon-si (KR); Ji Min Lee, Goyang-si (KR); Chang Ho Noh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/422,563

(22) Filed: Apr. 13, 2009

(65) Prior Publication Data

US 2010/0039025 A1 Feb. 18, 2010

(30) Foreign Application Priority Data

Aug. 12, 2008 (KR) .................. 10-2008-0079041

(51) Int. Cl.
*H01J 1/62* (2006.01)
*H01J 63/04* (2006.01)
*C07C 69/76* (2006.01)
*C07D 333/24* (2006.01)
*C07D 409/00* (2006.01)

(52) U.S. Cl. .......... 313/504; 359/265; 359/273; 549/59; 549/79; 560/20; 560/95

(58) Field of Classification Search .................. 313/504; 560/95, 20; 549/59, 79; 359/265, 273
See application file for complete search history.

(56) References Cited

U.S. PATENT DOCUMENTS

| | | | | |
|---|---|---|---|---|
| 5,446,134 A | * | 8/1995 | Armand et al. | 534/558 |
| 2004/0199016 A1 | * | 10/2004 | Shirota et al. | 564/405 |
| 2007/0139756 A1 | * | 6/2007 | Agrawal et al. | 359/265 |
| 2009/0097096 A1 | | 4/2009 | Noh et al. | |

FOREIGN PATENT DOCUMENTS

| | | | |
|---|---|---|---|
| JP | 07-094807 | | 4/1995 |
| JP | 10-036831 | * | 2/1998 |
| WO | 97/35227 | | 9/1997 |
| WO | 98/05737 | | 2/1998 |

OTHER PUBLICATIONS

W. Sharmoukh, Kyoung Chul Ko, So Yeon Park, Ju Hong Ko, Ji Min Lee, Changho Noh, Jin Yong Lee, and Seung Uk Son Molecular Design and Preparation of Bis-isophthalate Electrochromic Systems having Controllable Color and Bistability, Organic Letters 2008 vol. 10, No. 23 5365-5368, 2008 American Chemical Society.*
Boyapati M. Choudary, Naidu S. Chowdari, Karangula Jyothi, and Mannepalli L. Kantam, Catalytic Asymmetric Dihydroxylation of Olefins with Reusable OsO4 2- on Ion-Exchangers: The Scope and Reactivity Using Various Cooxidants, J. Am. Chem. Soc. 2002, 124, 5341-5349, 2002 American Chemical Society.*
Abdullah Zafar, Ji Yang, Steven J. Geib and Andrew D. Hamilton, Linked Bis-Isophthalic Acid Derivatives As Building Blocks in the Design of Self-Assembling Structures,Tetrahedron Letters, vol. 37, No. 14, pp. 2327-2330, 1996,Copyright O 1996 Elsevier Science Ltd.*
"Tetramethyl biphenyl-3, 5, 3', 5',-tetracarboxylate benzene sesquisolvate"; Authors: Coles, et al.; ACTA Crystallographica Section E, vol. 58, No. 8, pp. 0887-0888 (2002).
"P-105: New Electrochromic Systems having Controllable Color and Bistability"; Authors: Noh, et al.; SID Symposium Digest of Technical Papers, vol. 40, No. 1, pp. 1508-1511 (2008).
"5-Substitute isophthalate-based organic electrochromic materials"; Authors: Sharmoukh, et al.; Journal of Materials Chemistry 2008 Royal Society of Chemistry; vol. 18, No. 37, pp. 4408-4413 (2008).
"Molecular Design and Preparation of Bis-isophthalate Electrochromic Systems having Controllable Color and Bistability"; Authors: Sharmoukh, et al.; Organic Letters; vol. 10, No. 23, pp. 5365-5368 (2008).
"High H2 Adsorption by Coordination-Framework Materials"; Authors: Lin, et al.; Nagewandte Chemie, Int. Ed., vol. 45, No. 44, pp. 7358-7364 (2006).
European Search Report dated Nov. 12, 2009.

* cited by examiner

*Primary Examiner* — Bijan Ahvazi
(74) *Attorney, Agent, or Firm* — Cantor Colburn LLP

(57) ABSTRACT

Disclosed herein are novel electrochromic materials. The electrochromic materials produce various colors and have bistability to achieve red-green-blue full colors. Therefore, the electrochromic materials can be used in a variety of electrochromic devices. Also disclosed herein are electrochromic devices fabricated using the electrochromic materials.

13 Claims, 4 Drawing Sheets

ELECTROCHROMIC MATERIALS AND ELECTROCHROMIC DEVICES USING THE SAME

CROSS-REFERENCE TO RELATED APPLICATIONS

This non-provisional application claims priority to Korean Patent Application No. 10-2008-0079041, filed on Aug. 12, 2008, and all the benefits accruing therefrom under U.S.C. §119, the entire contents of which is incorporated herein in its entirety by reference.

BACKGROUND

1. Field

This disclosure is directed to novel electrochromic materials and electrochromic devices fabricated using the electrochromic materials. More specifically, the electrochromic materials produce various colors and have bistability.

2. Description of the Related Art

Electrochromism is the phenomenon displayed by some chemical species wherein the species has a reversibly changeable color when a voltage is applied thereto. A material capable of undergoing reversible changes of optical properties such as color upon an electrochemical redox reaction is called an electrochromic material. The electrochromic material may not have a color in the absence of an electric field and then may display a certain color when an electric field is applied, for example, by an external source. Alternatively, the electrochromic material may have a color in the absence of an electric field and then may display no color when an electric field is applied.

Electrochromic devices taking advantage of such an electrochromic phenomenon have various advantages, such as high reflectivity without a need for an external light source, excellent flexibility and portability, and the possibility of weight reduction. Therefore, these electrochromic devices have promising applications for various flat-panel displays ("FPDs"). In particular, electrochromic devices are receiving a great deal of attention, due to high potential for use in E-paper, which is currently undergoing intense research and development as an electronic medium capable of replacing paper.

Examples of electrochromic materials include inorganic compounds such as tungsten oxides, molybdenum oxides, and the like, and organic compounds such as pyridine, aminoquinone and azine compounds. However, even though nano-electrochromic blue and green electrochromic materials are known, red electrochromic materials are not yet well developed.

In comparison with inorganic electrochromic materials, organic electrochromic materials have a disadvantage in terms of long-term stability, but have advantages in that they are applicable to flexible substrates and can be used to form thin films by wet processing. Based on these advantages, a great deal of research has been conducted on organic electrochromic materials.

Further, a combination of red, green and blue is required to achieve full-color electrochromic devices. However, few red electrochromic materials have been discovered to date. Under such circumstances, there exists a need to develop red electrochromic materials.

SUMMARY

Disclosed herein is a novel electrochromic material represented by the following Formula 1:

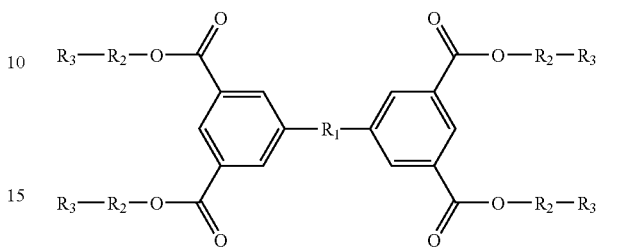

FORMULA (1)

wherein $R_1$ is selected from the group consisting of a single bond, a $C_6$-$C_{50}$ aryl group which is unsubstituted or substituted with at least one group selected from halo, hydroxyl, amino, cyano, nitro, thienyl, $C_1$-$C_7$ alkyl and $C_2$-$C_7$ alkenyl, a $C_5$-$C_{50}$ heteroaryl group which is unsubstituted or substituted with at least one group selected from halo, hydroxyl, amino, cyano, nitro, thienyl, $C_1$-$C_7$ alkyl and $C_2$-$C_7$ alkenyl, a thienyl group, a bithienyl group, a $C_2$-$C_{20}$ alkenyl group conjugated with at least one heteroatom selected from S and O or with the isophthalate groups at both ends thereof, a $C_2$-$C_{20}$ alkynyl group, a $C_3$-$C_{20}$ alkenylalkyl group, a $C_3$-$C_{20}$ alkynylalkyl group and a $C_4$-$C_{20}$ alkenylalkynyl group, wherein each $R_2$ is —$(CH_2)_m$— (wherein m is an integer from 1 to 10), and wherein each $R_3$ is selected from the group consisting of —H, —CH=$CH_2$, a 1,2-ethanediol group, a $C_1$-$C_{10}$ linear, branched or cyclic alkyl group, a $C_2$-$C_{10}$ linear or branched alkenyl group, a $C_6$-$C_{12}$ aryl group, a $C_5$-$C_{12}$ heteroaryl group, a carboxylic acid group and a phosphonic acid group.

Also disclosed herein is an electrochromic device including a transparent electrode, an opposite electrode disposed substantially opposite to the transparent electrode, and an electrochromic layer interposed between the transparent and opposite electrodes, wherein the electrochromic layer contains the electrochromic material of Formula 1.

BRIEF DESCRIPTION OF THE DRAWINGS

The exemplary embodiments will be more clearly understood from the following detailed description taken in conjunction with the accompanying drawings, where.

DETAILED DESCRIPTION

Figure 1:
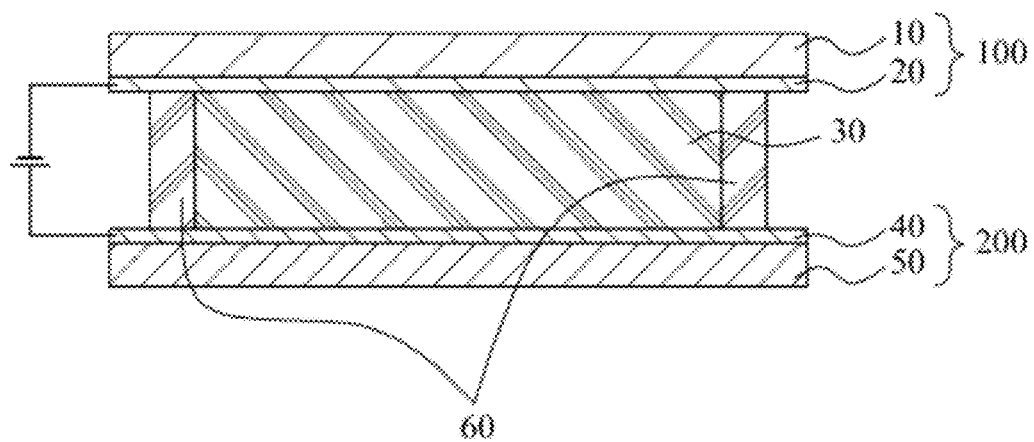
FIG. 1 is a schematic cross-sectional view illustrating the structure of an exemplary embodiment of an electrochromic device.

Exemplary embodiments now will be described more fully hereinafter with reference to the accompanying drawings, in which exemplary embodiments are shown. These exemplary embodiments can, however, be embodied in many different forms and should not be construed as limited to the embodiments set forth herein. Rather, these exemplary embodiments are provided so that this disclosure will be thorough and complete, and will fully convey the scope of the exemplary embodiments to those skilled in the art. Like reference numerals refer to like elements throughout.

It will be understood that when an element is referred to as being "on" another element, it can be directly on, the other element or intervening elements can be present. As used herein, the term "and/or" includes any and all combinations of one or more of the associated listed items.

It will be understood that, although the terms first, second, third, or the like, can be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the embodiments.

The terminology used herein is for the purpose of describing particular embodiments only and is not intended to be limiting of the exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "tops" can be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments of the exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, a region illustrated or described as flat can have rough and/or nonlinear features. Moreover, sharp angles that are illustrated can be rounded. Thus, the regions illustrated in the figures are schematic in nature and their shapes are not intended to illustrate the precise shape of a region and are not intended to limit the scope of exemplary embodiments.

Hereinafter, exemplary embodiments will be described in detail with reference to the accompanying drawings.

According to one exemplary embodiment, there is provided an electrochromic material represented by the following Formula 1:

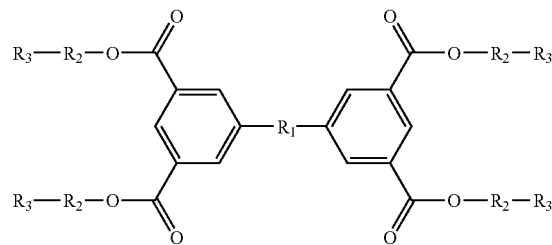

FORMULA (1)

wherein $R_1$ is selected from the group consisting of a single bond, a $C_6$-$C_{50}$ aryl group which is unsubstituted or substituted with at least one group selected from halo, hydroxyl, amino, cyano, nitro, thienyl, $C_1$-$C_7$ alkyl and $C_2$-$C_7$ alkenyl, a $C_5$-$C_{50}$ heteroaryl group which is unsubstituted or substituted with at least one group selected from halo, hydroxyl, amino, cyano, nitro, thienyl, $C_1$-$C_7$ alkyl and $C_2$-$C_7$ alkenyl, a thienyl group, a bithienyl group, a $C_2$-$C_{20}$ alkenyl group conjugated with at least one heteroatom selected from S and O or with the isophthalate groups at both ends thereof, a $C_2$-$C_{20}$ alkynyl group, a $C_3$-$C_{20}$ alkenylalkyl group, a $C_3$-$C_{20}$ alkynylalkyl group and a $C_4$-$C_{20}$ alkenylalkynyl group, wherein each $R_2$ is independently —$(CH_2)_m$— (wherein m is an integer from 1 to 10), and wherein each $R_3$ is independently selected from the group consisting of —H, —CH=CH$_2$, a 1,2-ethanediol group, a $C_1$-$C_{10}$ linear, branched or cyclic alkyl group, a $C_2$-$C_{10}$ linear or branched alkenyl group, a $C_6$-$C_{12}$ aryl group, a $C_5$-$C_{12}$ heteroaryl group, a carboxylic acid group and a phosphonic acid group. In the Formula 1, each of $R_2$ may be independently the same or different from each other.

In one exemplary embodiment, $R_1$ in Formula 1 can be selected from the group consisting of a single bond, a phenyl group, a biphenyl group, a terphenyl group, a thienyl group and a bithienyl group.

Exemplary embodiments of the electrochromic material can be selected from the group consisting of, but not necessarily limited to, the compounds represented by Formulas 2 to 13:

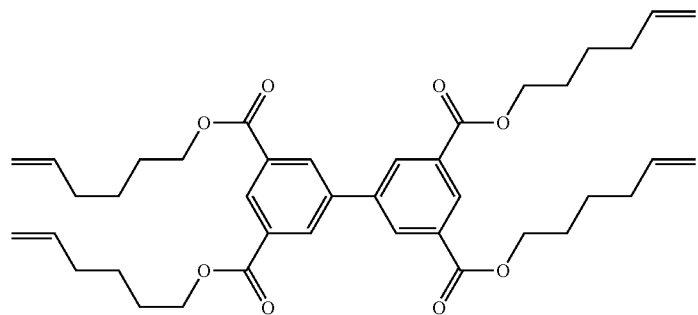
FORMULA (2)
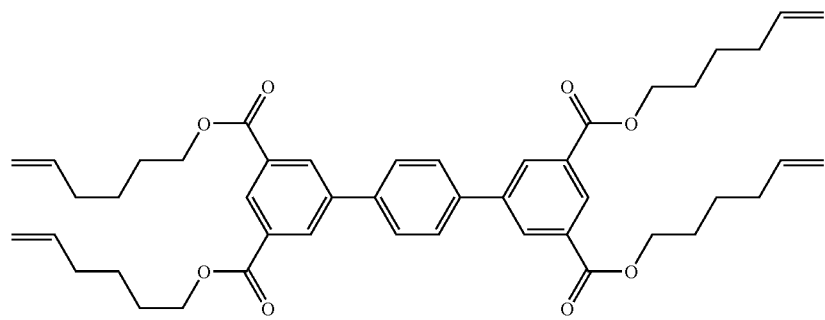
FORMULA (3)
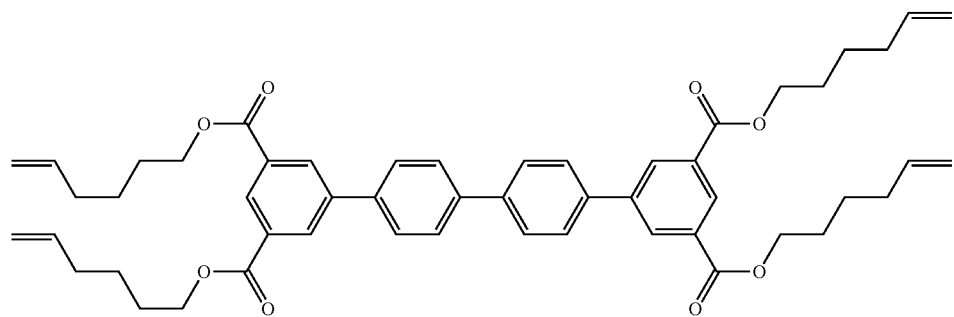
FORMULA (4)
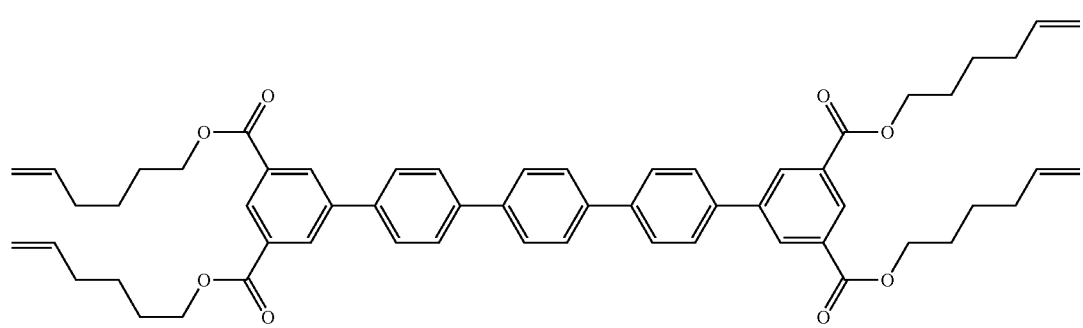
FORMULA (5)
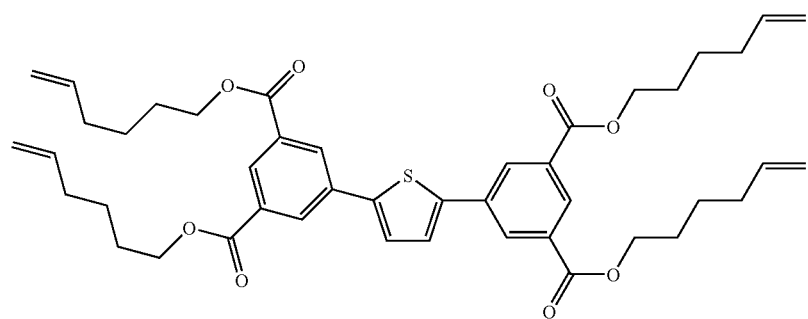
FORMULA (6)

FORMULA (7)
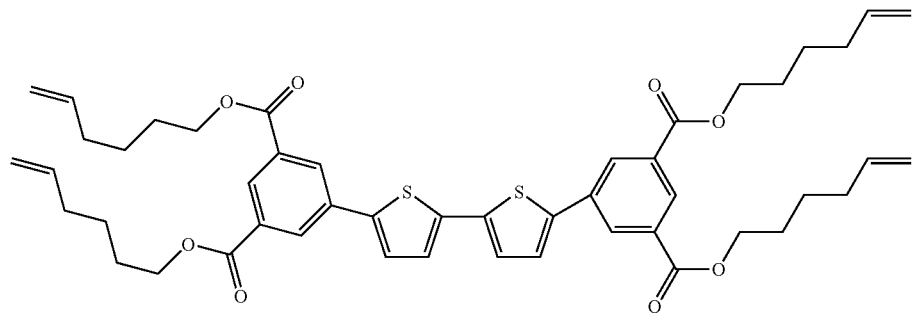
FORMULA (8)
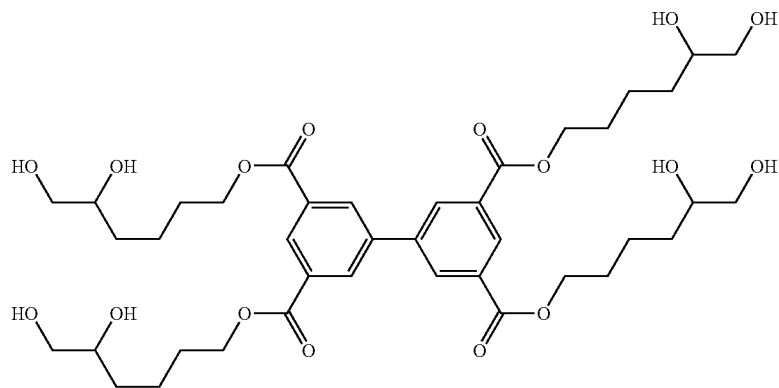
FORMULA (9)
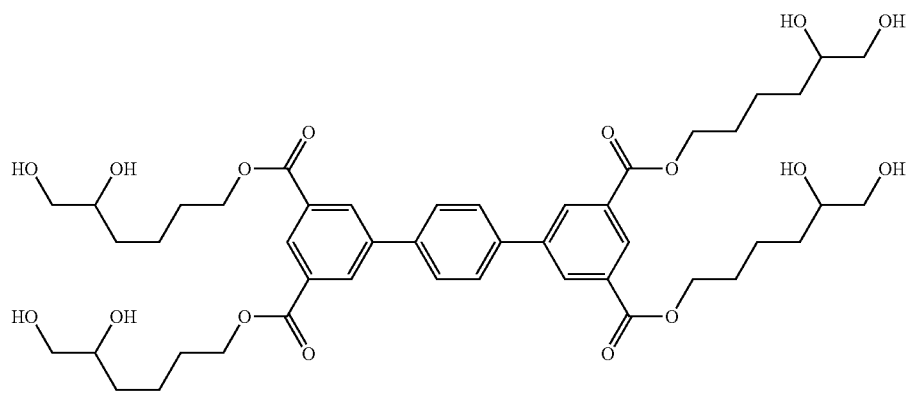
FORMULA (10)
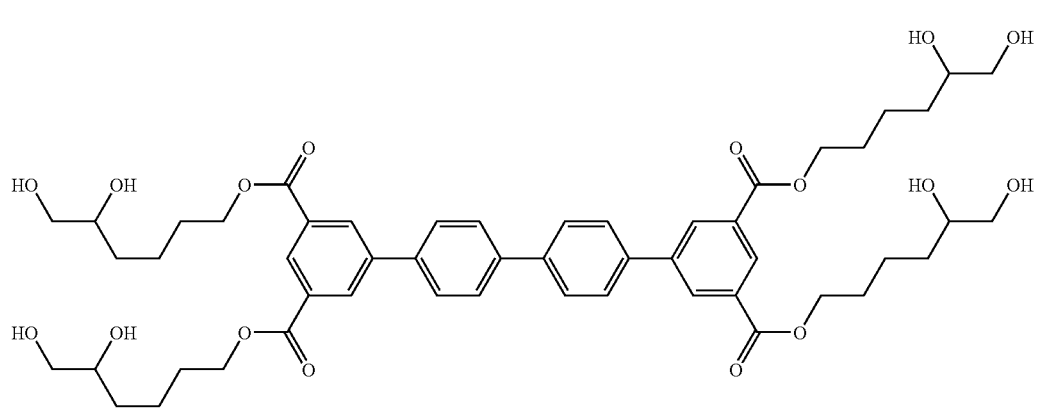

FORMULA (11)
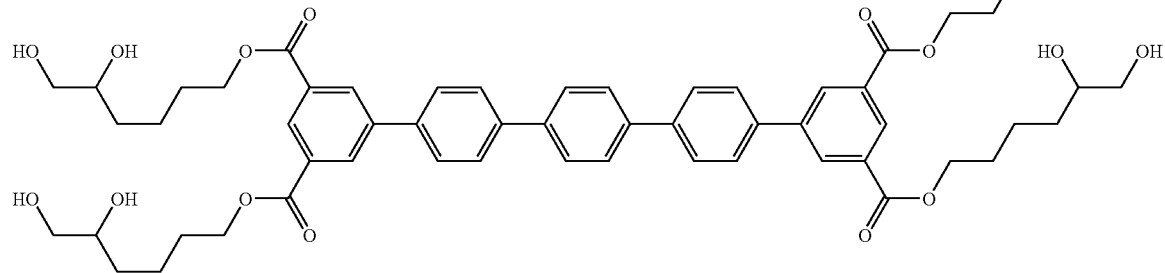
FORMULA (12)
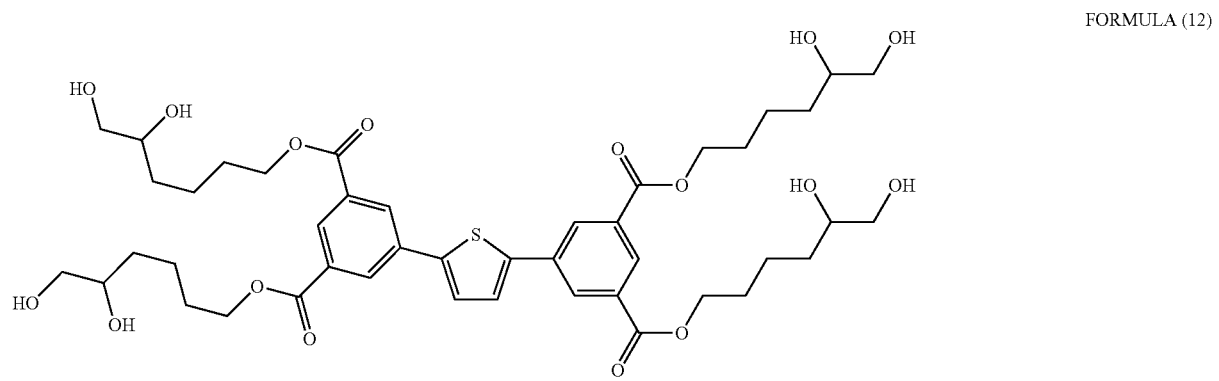
FORMULA (13)
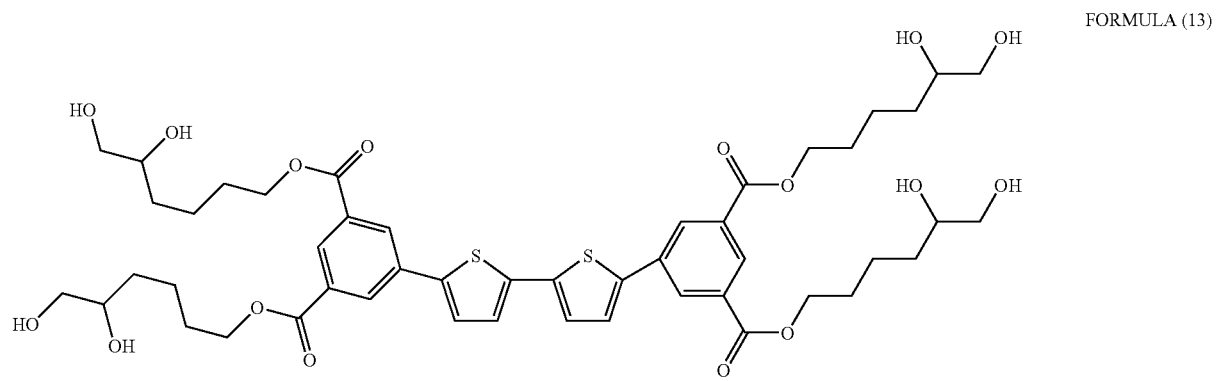

In one exemplary embodiment, the compound of Formula 2 can be synthesized by reacting the bispinacolatoborane-substituted isophthalate compound with the iodoisophthalate compound under heating in the presence of palladium acetate, tri-o-tolylphosphine and potassium carbonate, as depicted in Reaction 1:

REACTION (1)

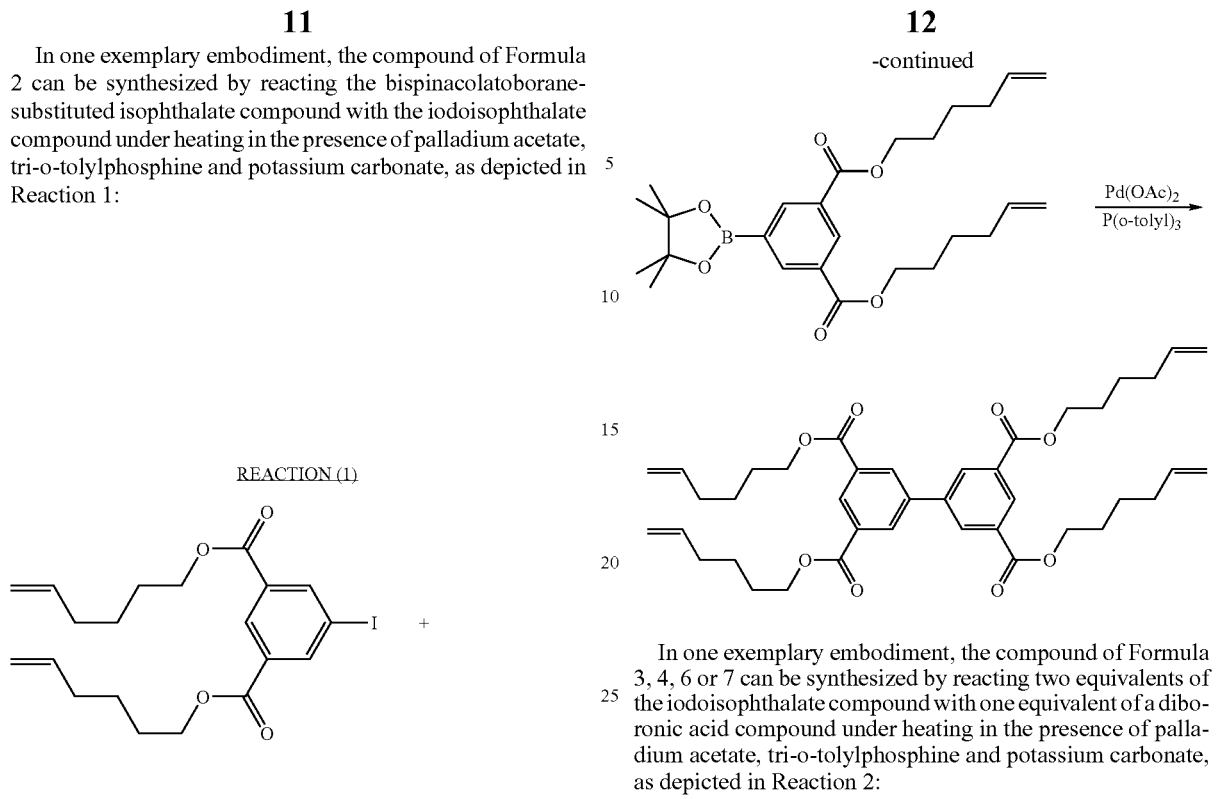

In one exemplary embodiment, the compound of Formula 3, 4, 6 or 7 can be synthesized by reacting two equivalents of the iodoisophthalate compound with one equivalent of a diboronic acid compound under heating in the presence of palladium acetate, tri-o-tolylphosphine and potassium carbonate, as depicted in Reaction 2:

REACTION (2)

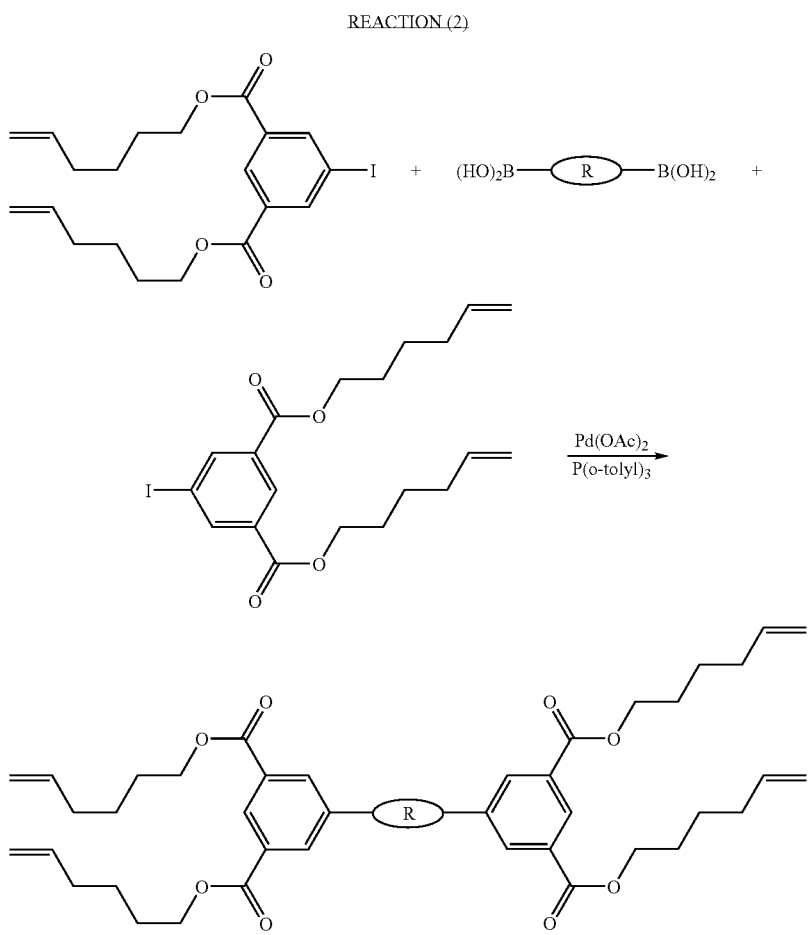

wherein R is selected from the group consisting of 1,4-phenyl, 4,4-biphenyl, 2,5-thienyl and 2,2',5,5'-bithienyl groups.

In one exemplary embodiment, the compound of Formula 5 can be synthesized by reacting two equivalents of the bispinacolatoborane-substituted isophthalate compound with one equivalent of diiodo-p-terphenyl under heating in the presence of palladium acetate, tri-o-tolylphosphine and potassium carbonate, as depicted in Reaction 3:

REACTION (3)

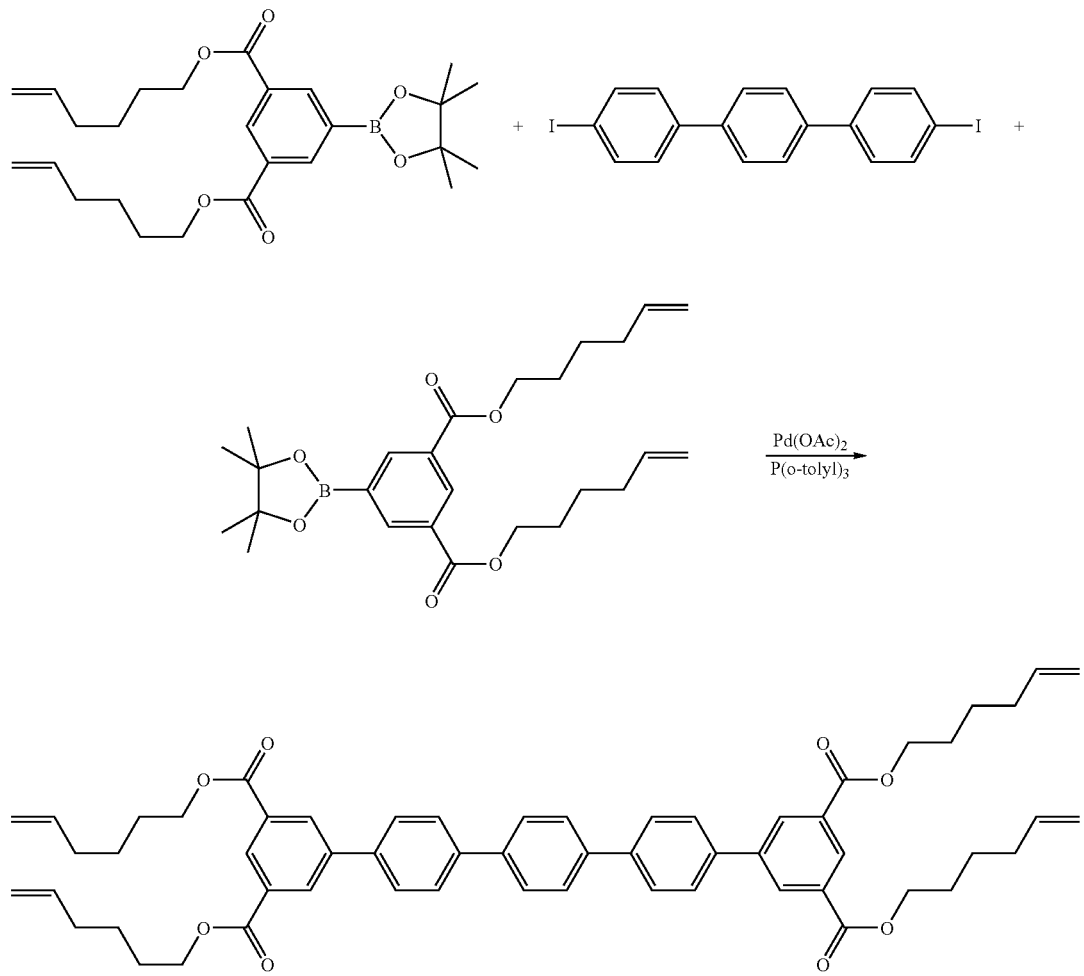

In one exemplary embodiment, the compound of Formula 8 can be synthesized by reacting the compound of Formula 2 as a starting material with methylmorpholine oxide in the presence of $OsO_4$ as a catalyst with stirring at room temperature, as depicted in Reaction 4:

REACTION (4)

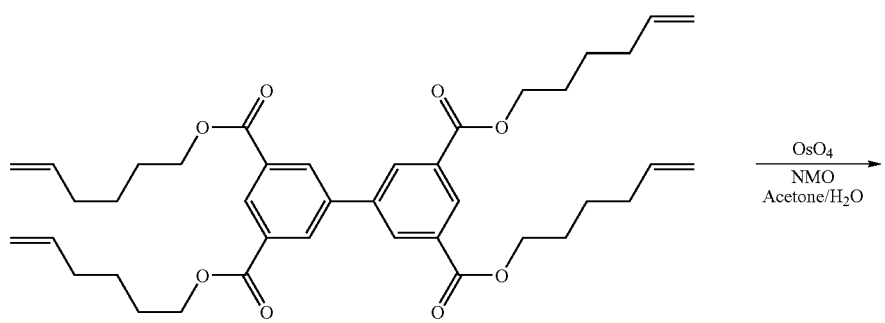

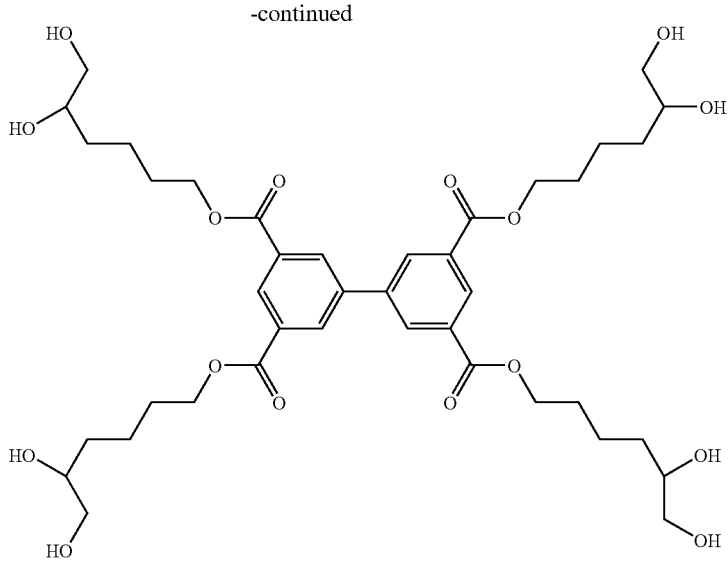

In one exemplary embodiment, the compound of Formula 9, 10, 12 or 13 can be synthesized by reacting the product prepared by Reaction 2 as a starting material with methylmorpholine oxide in the presence of $OsO_4$ as a catalyst with stirring at room temperature, as depicted in Reaction 5:

wherein R is selected from the group consisting of 1,4-phenyl, 4,4-biphenyl, 2,5-thienyl and 2,2',5,5'-bithienyl groups.

In one exemplary embodiment, the compound of Formula 11 can be synthesized by reacting the compound of Formula

REACTION (5)

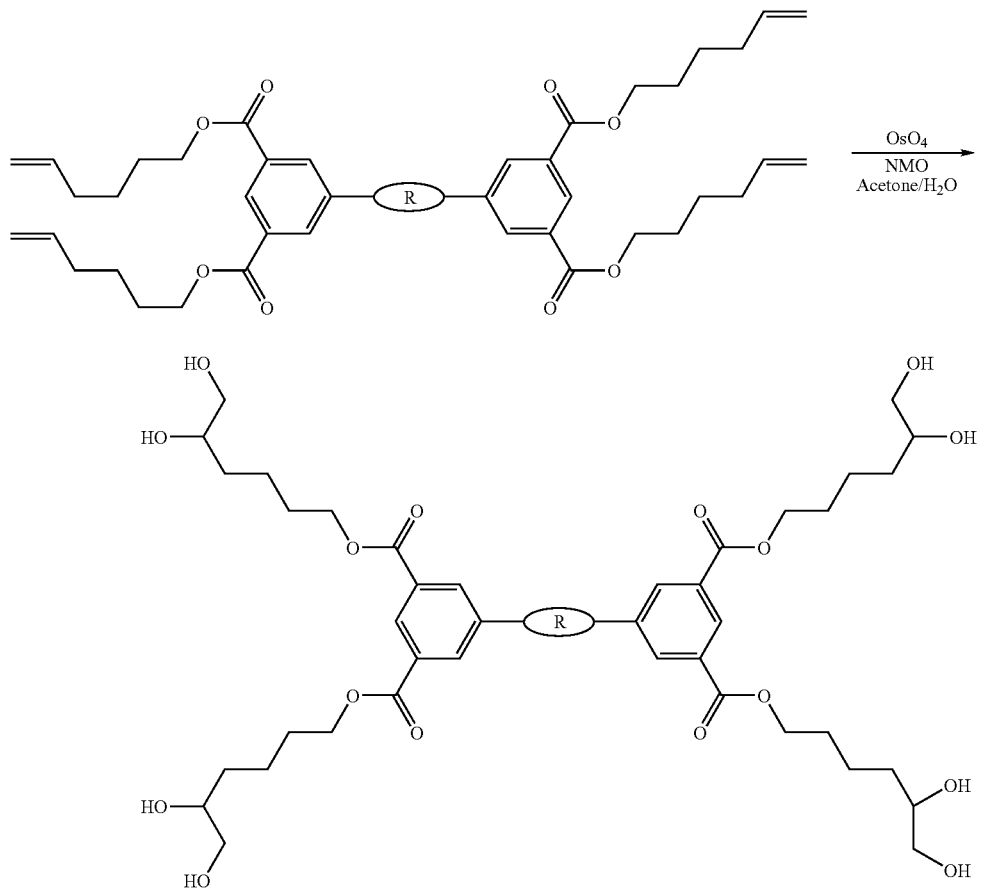

5 as a starting material with methylmorpholine oxide in the presence of $OsO_4$ as a catalyst with stirring at room temperature, as depicted in Reaction 6:

tive film 40, an opposite electrode 100, which is disposed substantially opposite to the transparent electrode 200, and that includes, or alternatively consists essentially of or con-

REACTION (6)

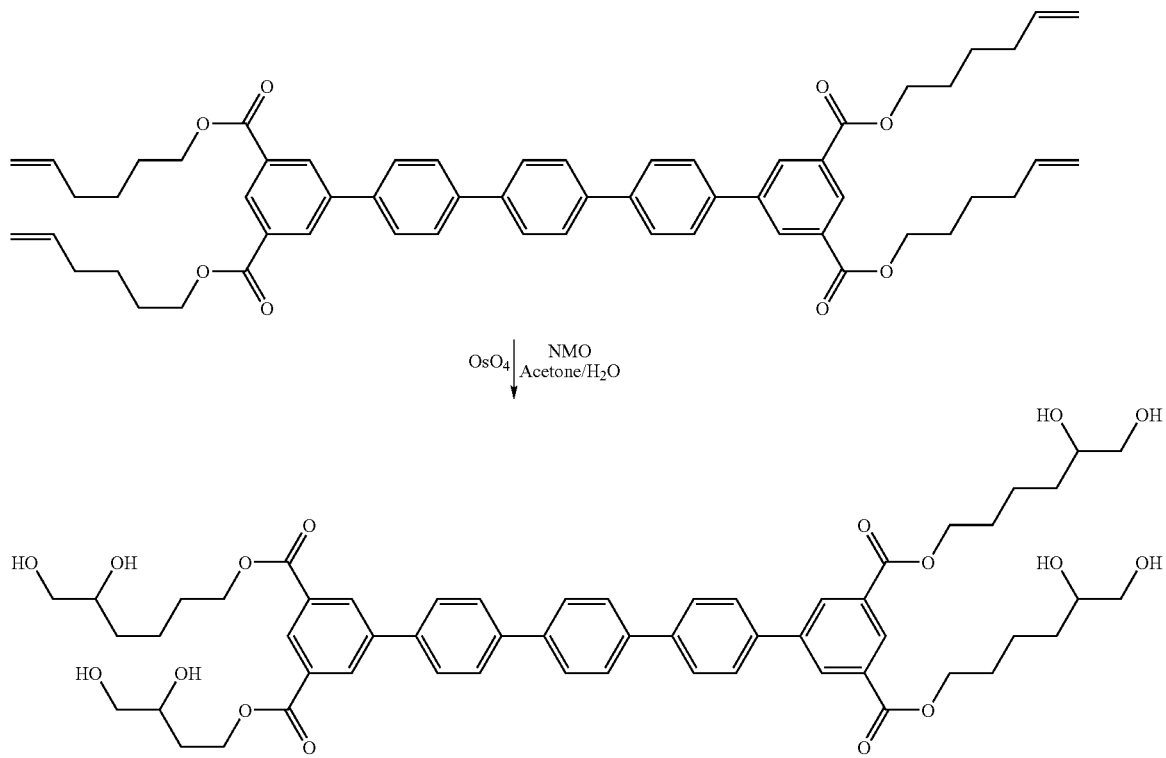

In accordance with another exemplary embodiment, there is provided an electrochromic device including a transparent electrode and an opposite electrode disposed substantially opposite to each other and an electrochromic layer interposed between the pair of electrodes, wherein the electrochromic layer contains the electrochromic material of Formula 1.

It would be apparent to one of ordinary skill in the art that the electrochromic device can be fabricated by any suitable well-known method with the exception that the electrochromic layer is formed using the above described exemplary embodiment of an electrochromic material.

FIG. 1 is a schematic cross-sectional view of an exemplary embodiment of the electrochromic device. Referring to FIG. 1, the electrochromic device has a structure containing a pair of electrodes, including a transparent electrode 200 and an opposite electrode 100, where the pair of electrodes is disposed substantially opposite to each other and an electrochromic layer 30 is interposed between the pair of electrodes.

The transparent electrode 200 includes, or alternatively consists essentially of or consists of, a substrate 50 and a conductive film 40, and the opposite electrode 100, which is disposed substantially opposite to the transparent electrode 200, includes, or alternatively consists essentially of or consists of, a conductive film 20 and a substrate 10. Spacers 60 are disposed between the transparent electrode 200 and the opposite electrode 100 to maintain a cell gap therebetween.

Figure 2:
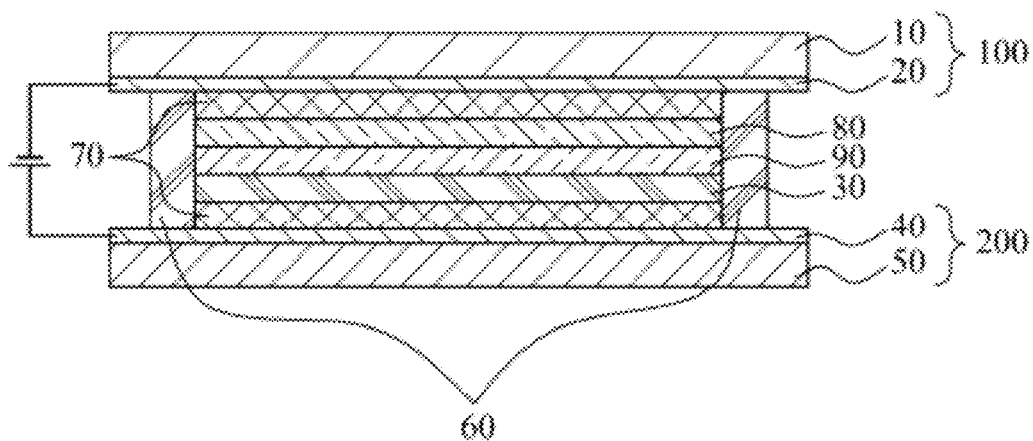
FIG. 2 is a schematic cross-sectional view illustrating the structure of another exemplary embodiment of an electrochromic device.

FIG. 2 is a schematic cross-sectional view illustrating another exemplary embodiment of the electrochromic device. Referring to FIG. 2, the electrochromic device includes a transparent electrode 200 that includes, or alternatively consists essentially of or consists of, a substrate 50 and a conductive film 40, an opposite electrode 100, which is disposed substantially opposite to the transparent electrode 200, and that includes, or alternatively consists essentially of or consists of a substrate 10 and a conductive film 20, nanocrystal layers 70 composed of nanocrystal particles on the conductive films 20 and 40, an electrochromic layer 30 formed on one of the nanocrystal layers 70, an electron transport layer 80 formed on the other nanocrystal layer 70, and an electrolyte layer 90 formed between the electrochromic layer 30 and the electron transport layer 80.

In one exemplary embodiment, the electrochromic layer 30 can be formed by adsorbing, coating, supporting or attaching the electrochromic material selected from the group consisting of at least one of the compounds of Formulas 8 to 13 on the nanocrystal particles of the nanocrystal layer 70 formed on the conductive film 40. This is accomplished by taking advantage of the ability of the selected electrochromic material to be readily adsorbed to the nanocrystal particles due to the presence of the terminal hydroxyl groups.

In one exemplary embodiment, the electron transport layer 80 can be formed by adsorbing, coating, supporting or attaching the nanocrystal particles of the nanocrystal layer 70 formed on the conductive film 20 with the compound of Formula 14:

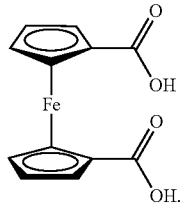

FORMULA (14)

The formation of the electron transport layer 80 using the compound of Formula 14 is accomplished by taking advantage of the ability of the compound to be readily adsorbed to the nanocrystal particles due to the presence of the terminal hydroxyl groups.

The nanocrystal particles can be those that have various electrical properties inherent to semiconductors. Exemplary embodiments of the nanocrystal particles can be selected from the group consisting of, but not necessarily limited to, at least one of titanium dioxide ($TiO_2$), zinc oxide (ZnO) and tungsten oxide ($WO_3$) nanocrystal particles.

In one exemplary embodiment, the nanocrystal particles can have various shapes, including spheres, tetrahedrons, cylinders, rods, triangles, discs, tripods, tetrapods, cubes, boxes, stars and tubes.

In one exemplary embodiment, the electrochromic layer 30 can be formed using a solution of the electrochromic material in an electrolyte. In such an exemplary embodiment, any of several well-known materials can be used as the electrolyte, and exemplary embodiments thereof include, but are not limited to, solutions of lithium salts, potassium salts and sodium salts in suitable solvents as would be apparent to one of ordinary skill in the art.

In one exemplary embodiment, the electrolyte can be a solution of tetrabutylammonium hexafluorophosphate or a solution of $LiClO_4$, but the exemplary embodiments are not necessarily limited thereto.

In one exemplary embodiment, the electrochromic layer can be formed by directly coating the isophthalate compound on the transparent electrode. In such an exemplary embodiment, the use of a gel electrolyte, such as a composite of poly(vinylpyrrolidinone), tetrabutylammonium perchlorate and polymethylmethacrylate, can be utilized.

The conductive films 20 and 40 of the respective opposite electrode 100 and transparent electrode 200 can function as an anode and a cathode. A voltage applied between the transparent electrode 200 and the opposite electrode 100 allows the electrochromic material to react with ions and electrons present in the electrolyte, resulting in a change in the color of the electrochromic material.

According to one exemplary embodiment, the electrochromic device can turn red in response to a voltage applied thereto when the device contains the electrochromic material of Formula 2:

FORMULA (2)

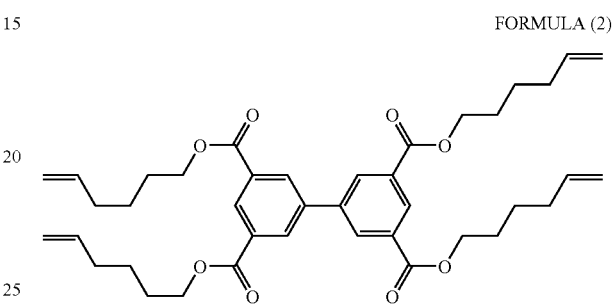

The electrochromic device can turn violet in response to a voltage applied thereto when the device contains the electrochromic material of Formula 3:

FORMULA (3)

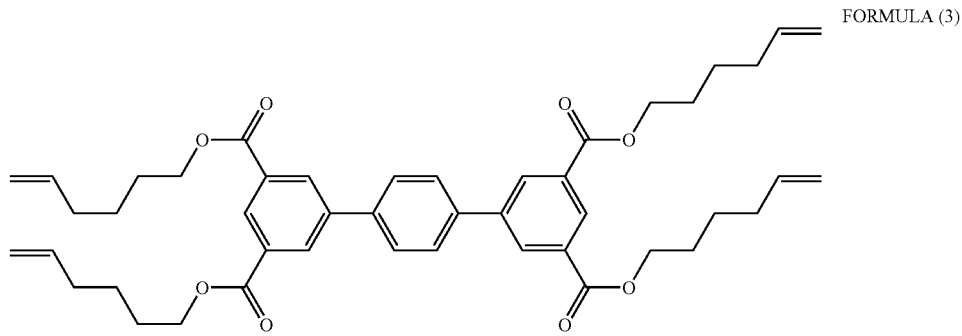

The electrochromic device can turn blue in response to a voltage applied thereto when the device contains the electrochromic material of Formula 4:

FORMULA (4)

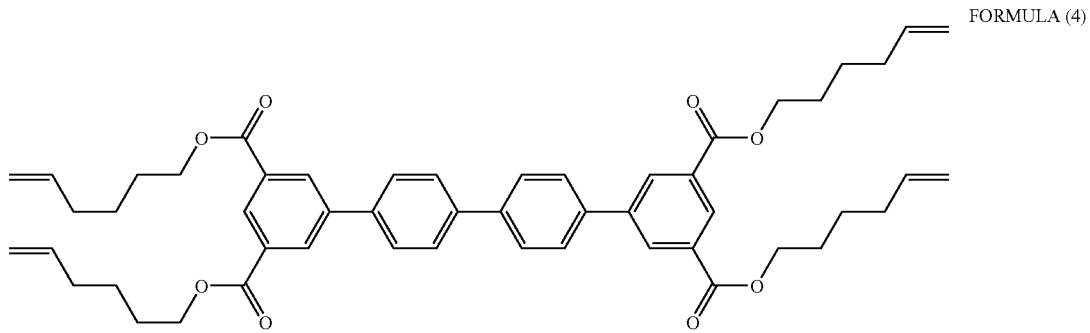

The electrochromic device can turn blue in response to a voltage applied thereto when the device contains the electrochromic material of Formula 5:

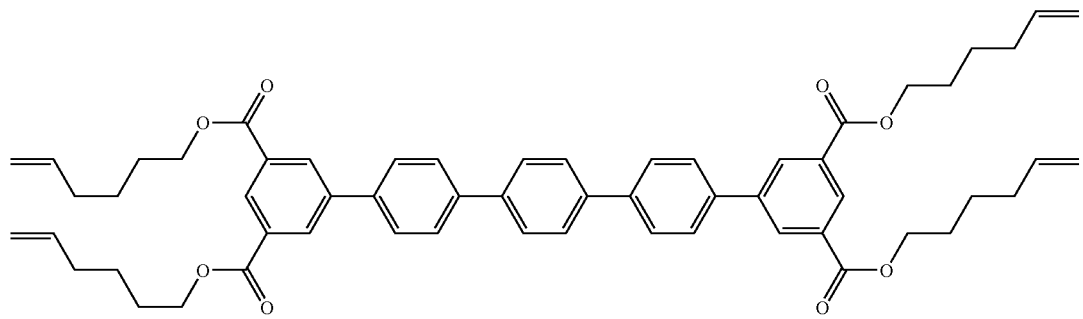

FORMULA (5)

The electrochromic device can turn blue in response to a voltage applied thereto when the device contains the electrochromic material of Formula 6:

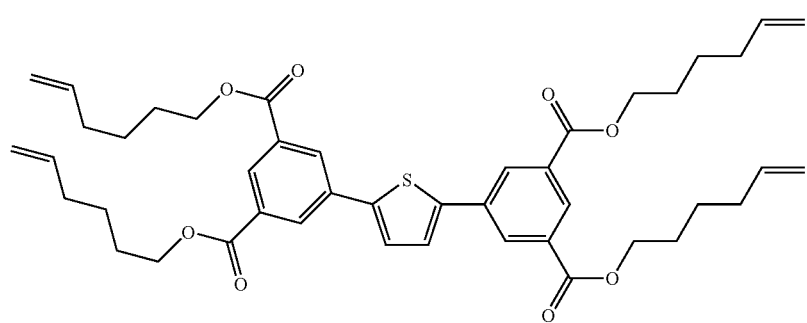

FORMULA (6)

The electrochromic device can turn bluish green in response to a voltage applied thereto when the device contains the electrochromic material of Formula 7:

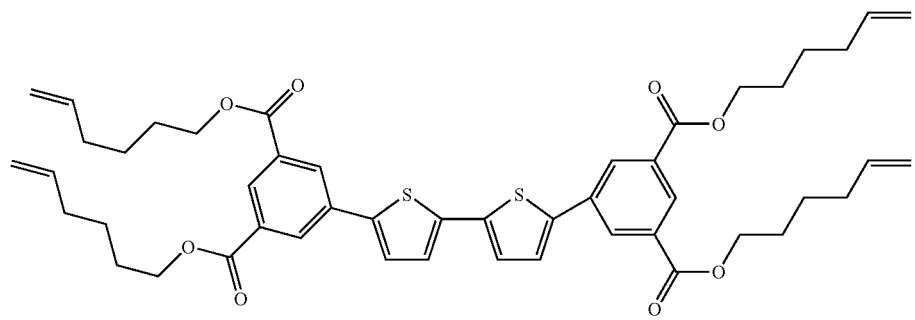

FORMULA (7)

The electrochromic device can turn red in response to a voltage applied thereto when the device contains the electrochromic material of Formula 8:

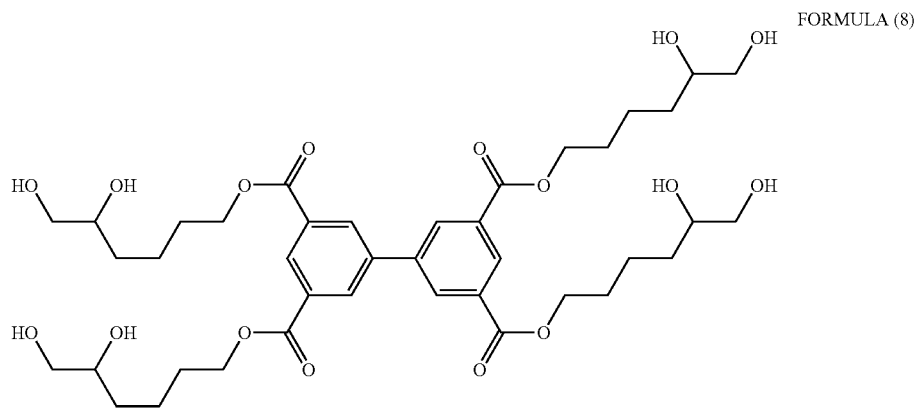

FORMULA (8)

The electrochromic device can turn violet in response to a voltage applied thereto when the device contains the electrochromic material of Formula 9:

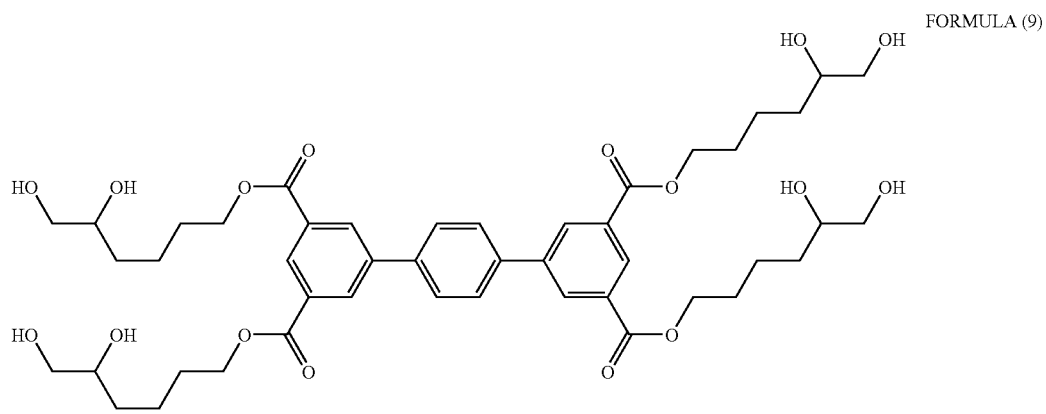

FORMULA (9)

The electrochromic device can turn blue in response to a voltage applied thereto when the device contains the electrochromic material of Formula 10:

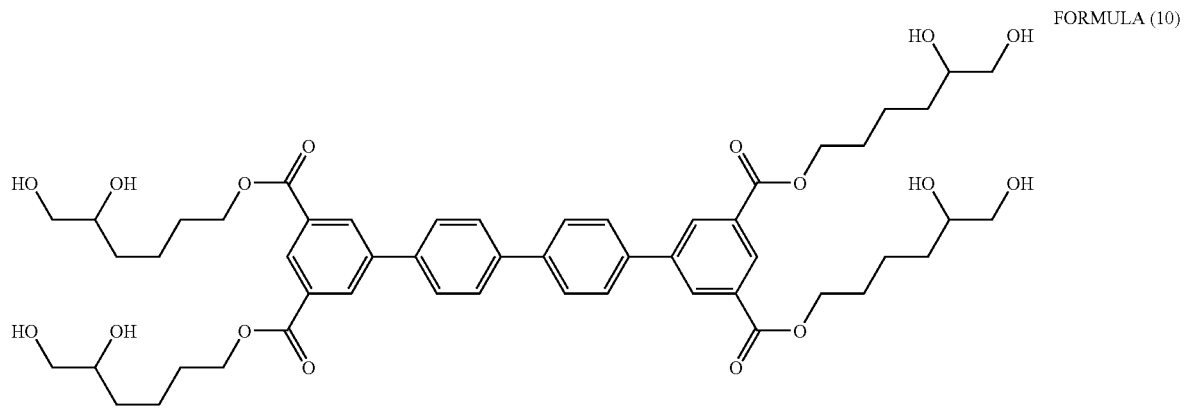

FORMULA (10)

The electrochromic device can turn blue in response to a voltage applied thereto when the device contains the electrochromic material of Formula 11:

FORMULA (11)

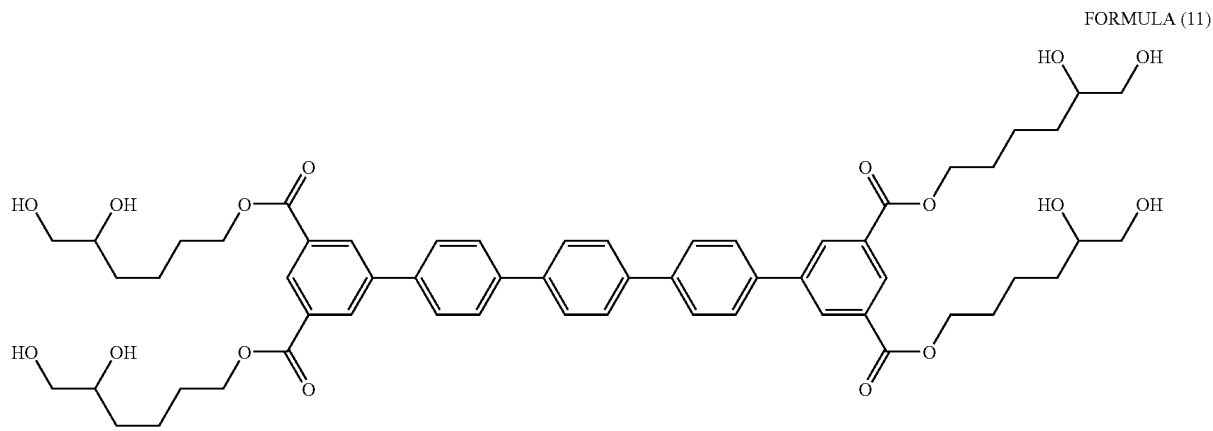

The electrochromic device can turn blue in response to a voltage applied thereto when the device contains the electrochromic material of Formula 12:

FORMULA (12)

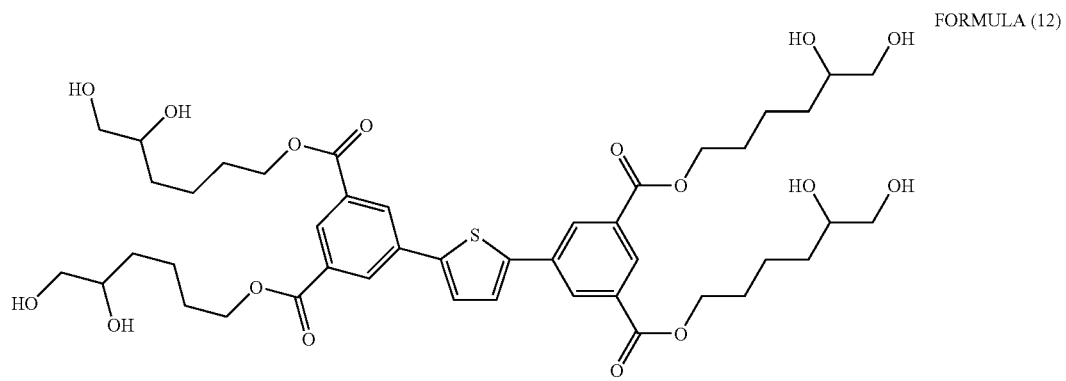

The electrochromic device can turn bluish green in response to a voltage applied thereto when the device contains the electrochromic material of Formula 13:

The electrochromic materials can produce blue, violet, bluish green and red colors to achieve red-green-blue (RGB) full colors, and therefore, they can be used in a variety of

FORMULA (13)

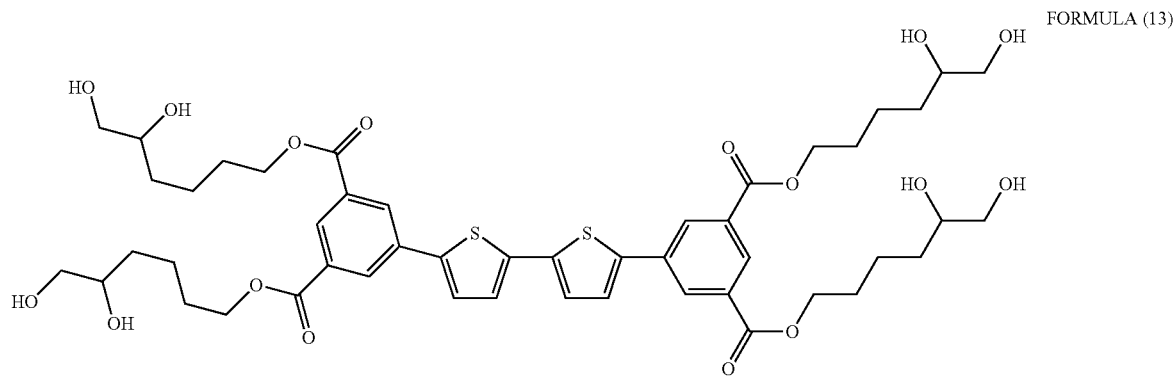

electrochromic devices. In addition, the electrochromic materials are suitable for use in the fabrication of bistable devices.

Non-limiting exemplary embodiments of the transparent substrates 10 and 50 include transparent inorganic substrates, exemplary embodiments of which include glass and quartz substrates, and transparent plastic substrates, exemplary embodiments of which include polyethylene terephthalate (PET), polyethylene naphthalate (PEN), polycarbonate, polystyrene and polypropylene substrates. Exemplary embodiments also include configurations having flexible substrates.

As would be apparent to one of ordinary skill in the art, a transparent conductive material can be coated on the transparent substrates 10 and 50 to form the conductive films 20 and 40, respectively, and the composition thereof is not particularly limited. Exemplary embodiments thereof include, but are not necessarily limited to, indium tin oxide (ITO), fluorine-doped tin oxide (FTO) and conductive polymers, e.g., polyphenylacetylene and polythiophene.

At least one electrochromic material selected from the group consisting of metal oxides, exemplary embodiments of which include tungsten oxide and molybdenum oxide, pyridine compounds, aminoquinone compound and viologens can be mixed with one of the electrochromic materials for the formation of the electrochromic layer 30.

A more detailed description of exemplary embodiments will be described in more detail with reference to the following examples. However, these examples are given merely for the purpose of illustration and are not to be construed as limiting the scope of the embodiments.

EXAMPLES

Preparation of Electrochromic Materials

Preparative Example 1

Synthesis of Isophthalate Compound

Bispinacolatoborane (0.33 g, 1.31 mmol), dihex-5-enyl-5-iodoisophthalate (0.3 g, 0.65 mmol), palladium acetate (7.3 mg, 5 mol %), tri-o-tolylphosphine (40 mg, 20 mol %) and potassium carbonate (0.44 g, 3.25 mmol) were added to a three-neck round bottom flask that was flushed with argon for 20 min. Dry DMF (20 mL) was added, and the mixture was heated at 90° C. for 4 h. A dark-brown color resulted. The mixture was cooled to room temperature.

After that, dihex-5-enyl-5-iodoisophthalate (0.3 g, 0.65 mmol), palladium acetate (7.3 mg, 5 mol %), tri-o-tolylphosphine (40 mg, 20 mol %) and potassium carbonate (0.44 g, 3.25 mmol) were added and the mixture was heated at 90° C. for 4 h.

The mixture was poured into water and extracted. The organic layer was washed thoroughly with water and brine to remove DMF and dried over magnesium sulfate. The residue after removal of solvent was applied to a silica gel column and the main product of Formula 2 was isolated as a colorless solid.

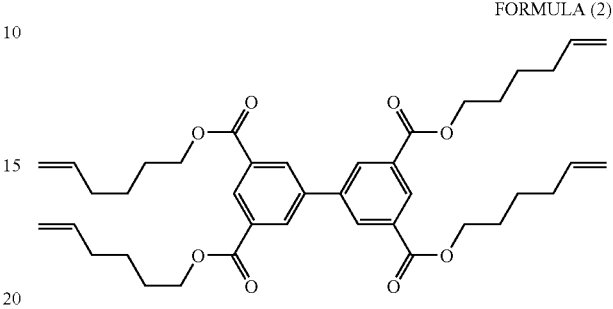

FORMULA (2)

The structure of the product was identified by $^1$H-NMR and $^{13}$C-NMR. The spectroscopic data for the product are as follows.

$^1$H NMR (300 MHz, CDCl$_3$): δ (ppm)=8.72 (s, 2H), 8.50 (s, 4H), 5.80 (m, 4H), 5.03 (d, J=14 Hz, 4H), 4.98 (d, J=6.9 Hz, 4H), 4.43 (t, J=6.6 Hz, 8H), 2.13 (q, J=6.9 Hz, 8H), 1.83 (q, J=6.9 Hz, 8H), 1.57 (q, J=6.9 Hz, 8H).

$^{13}$C NMR (75 MHz, CDCl$_3$): δ (ppm)=165.7, 140.1, 138.3, 132.4, 131.8, 130.2, 115.1, 65.7, 33.4, 28.2, 25.3.

Preparative Example 2

Synthesis of Isophthalate Compound

Benzene-1,4-diboronic acid (0.108 g, 0.65 mmol), dihex-5enyl-5-iodoisophthalate (0.6 g, 1.3 mmol), palladium acetate (14.6 mg, 5 mol %), tri-o-tolylphosphine (80 mg, 20 mol %) and potassium carbonate (0.89 g, 6.5 mmol) were added to a two-neck round bottom flask (100 ml) that was flushed with argon for 10 min. Dry DMF (30 mL) was added, and the mixture was heated at 90° C. for 4 h. A dark-brown color resulted. The mixture was poured into water and extracted. The organic layer was washed thoroughly with water and brine to remove DMF and dried over magnesium sulfate. The residue after removal of solvent was applied to a silica gel column and the main product of Formula 3 was isolated as white powder.

FORMULA (3)

The structure of the product was identified by $^1$H-NMR and $^{13}$C-NMR. The spectroscopic data for the product are as follows.

$^1$H NMR (300 MHz, CDCl$_3$): δ (ppm)=8.67 (s, 2H), 8.51 (s, 4H), 7.79 (s, 4H), 5.80 (m, 4H), 5.03 (d, J=14 Hz, 4H), 4.98 (d, J=6.9 Hz, 4H), 4.43 (t, J=6.6 Hz, 8H), 2.15 (q, J=6.9 Hz, 8H), 1.83 (q, J=6.9 Hz, 8H), 1.57 (q, J=6.9 Hz, 8H).

$^{13}$C NMR (75 MHz, CDCl$_3$): δ (ppm)=165.9, 141.1, 139.0, 138.4, 132.2, 131.6, 129.6, 127.9, 115.1, 65.6, 33.4, 28.2, 25.3.

Preparative Example 3

Synthesis of Isophthalate Compound

FORMULA (4)

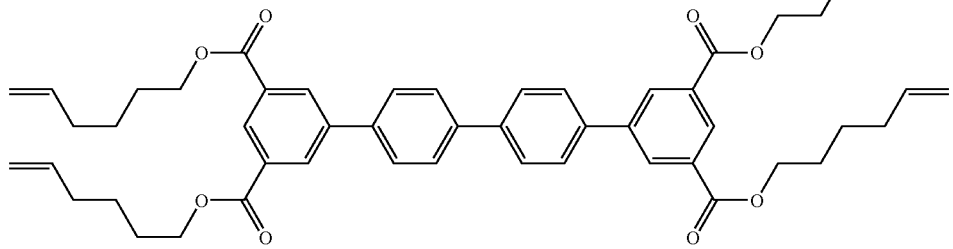

The compound of Formula 4 was prepared in the same manner as in Preparative Example 2 except that diphenyl-4,4-diboronic acid was used instead of benzene-1,4-diboronic acid. The structure of the compound of Formula 4 was identified by $^1$H-NMR and $^{13}$C-NMR. The spectroscopic data for the compound of Formula 4 are as follows.

$^1$H NMR (300 MHz, CDCl$_3$): δ (ppm)=8.57 (s, 2H), 8.46 (s, 4H), 7.48 (s, 2H), 5.82 (m, 4H), 5.03 (d, J=14 Hz, 4H), 4.98 (d, J=6.9 Hz, 4H), 4.38 (t, J=6.6 Hz, 8H), 2.15 (q, J=6.9 Hz, 8H), 1.84 (q, J=6.9 Hz, 8H), 1.57 (q, J=6.9 Hz, 8H).

$^{13}$C NMR (75 MHz, CDCl$_3$): δ (ppm)=165.5, 142.6, 138.4, 137.7, 131.7, 130.5, 129.5, 125.7, 115.1, 65.7, 33.4, 28.2, 25.3.

Preparative Example 4

Synthesis of Isophthalate Compound

Bispinacolatoborane (0.33 g, 1.31 mmol), dihex-5-enyl-5-iodoisophthalate (0.3 g, 0.65 mmol), palladium acetate (7.3 mg, 5 mol %), tri-o-tolylphosphine (40 mg, 20 mol %) and potassium carbonate (0.44 g, 3.25 mmol) were added to a three-neck round bottom flask that was flushed with argon. Dry DMF (20 mL) was added, and the mixture was heated at 90° C. for 4 h. A dark-brown color resulted. The mixture was cooled to room temperature.

After that, 4,4'-diiodo-p-terphenyl (0.14 g, 0.30 mmol), palladium acetate (7.3 mg, 5 mol %), tri-o-tolylphosphine (40 mg, 20 mol %) and potassium carbonate (0.44 g, 3.25 mmol) were added and the mixture was heated at 90° C. for 12 h.

The mixture was poured into water and extracted with diethyl ether. The organic layer was washed thoroughly with water and brine to remove DMF and dried over magnesium sulfate. The residue after removal of solvent was subjected to flash column chromatography to give the compound represented by Formula 5:

FORMULA (5)

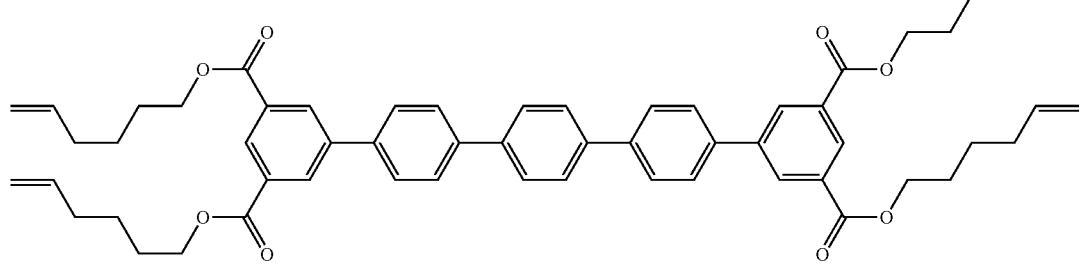

The structure of the compound was identified by $^1$H-NMR and $^{13}$C-NMR. The spectroscopic data for the compound are as follows.

$^1$H NMR (300 MHz, CDCl$_3$): δ (ppm)=8.66 (s, 2H), 8.52 (s, 4H), 7.77 (brs, 12H), 5.83 (m, 4H), 5.04 (d, J=14 Hz, 4H), 5.00 (d, J=6.9 Hz, 4H), 4.40 (t, J=6.9 Hz, 8H), 2.167 (q, J=6.9 Hz, 8H), 1.85 (q, J=6.9 Hz, 8H), 1.587 (q, J=6.9 Hz, 8H).

$^{13}$C NMR (75 MHz, CDCl$_3$): δ (ppm)=165.9, 141.4, 140.5, 139.7, 138.3, 135.4, 132.2, 131.6, 129.4, 127.6, 126.5, 115.1, 65.6, 33.4, 28.3, 25.4.

Preparative Example 5

Synthesis of Isophthalate Compound

The compound of Formula 6 was prepared in the same manner as in Preparative Example 2 except that 2,5-thienyldiboronic acid was used instead of benzene-1,4-diboronic acid. The structure of the compound of Formula 6 was identified by $^1$H-NMR and $^{13}$C-NMR. The spectroscopic data for the compound are as follows.

$^1$H NMR (300 MHz, CDCl$_3$): δ (ppm)=8.66 (s, 2H), 8.51 (s, 4H), 7.79 (s, 8H), 5.83 (m, 4H), 5.02 (d, J=14 Hz, 4H), 4.98 (d, J=6.9 Hz, 4H), 4.40 (t, J=6.6 Hz, 8H), 2.14 (q, J=6.9 Hz, 8H), 1.84 (q, J=6.9 Hz, 8H), 1.57 (q, J=6.9 Hz, 8H).

$^{13}$C NMR (75 MHz, CDCl$_3$): δ (ppm)=165.9, 141.3, 140.2, 138.4, 132.2, 131.6, 129.4, 127.8, 127.7, 115.1, 65.5, 33.4, 28.2, 25.3.

Preparative Example 6

Synthesis of Isophthalate Compound

The compound of Formula 7 was prepared in the same manner as in Preparative Example 2 except that 2,2',5,5'-dithienyldiboronic acid was used instead of benzene-1,4-diboronic acid. The structure of the compound of Formula 7 was identified by $^1$H-NMR and $^{13}$C-NMR. The spectroscopic data for the compound of Formula 7 are as follows.

$^1$H NMR (300 MHz, CDCl$_3$): δ (ppm)=8.56 (s, 2H), 8.43 (s, 4H), 7.41 (d, J=3.9 Hz, 2H), 7.24 (d, J=4.2 Hz, 2H), 5.85 (m, 4H), 5.06 (d, J=14 Hz, 4H), 4.98 (d, J=6.9 Hz, 4H), 4.39 (t, J=6.9 Hz, 8H), 2.16 (q, J=6.9 Hz, 8H), 1.85 (q, J=6.9 Hz, 8H), 1.58 (q, J=6.9 Hz, 8H).

$^{13}$C NMR (75 MHz, CDCl$_3$): δ (ppm)=165.7, 141.2, 138.4, 137.6, 134.8, 131.8, 125.4, 125.2, 115.2, 65.7, 33.4, 28.2, 25.4.

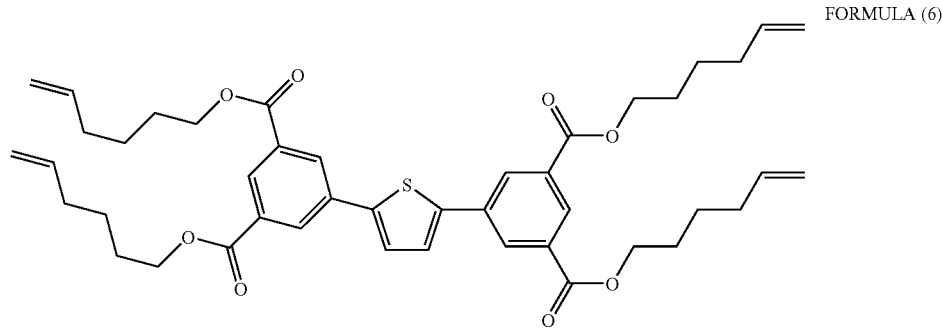

FORMULA (6)

Preparative Example 7

Synthesis of Isophthalate Compound

The isophthalate compound (0.33 mmol) prepared in Preparative Example 1 and 4-methylmorphline N-oxide (0.15 g, 1.33 mmol) were added to a two-neck round bottom flask (50 ml). Acetone and water (4:1) were added, and the mixture was stirred at room temperature for 30 min. After that, OsO$_4$ (0.1 mol %, 0.33 μmol, 0.08 mg) was added, and the mixture was stirred at room temperature for overnight. Then, 20 ml of acetone was added, and Na$_2$SO$_4$ (1.5 g) and Mg$_2$SO$_4$ (1.5 g) were added. The solution was filtered off and applied to column chromatography (methylene chloride/methanol; 9:1). The main product of Formula 8 was isolated as a white solid.

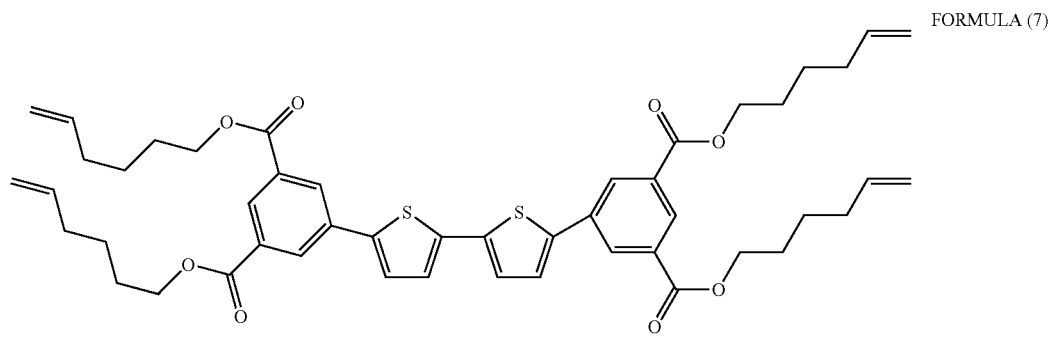

FORMULA (7)

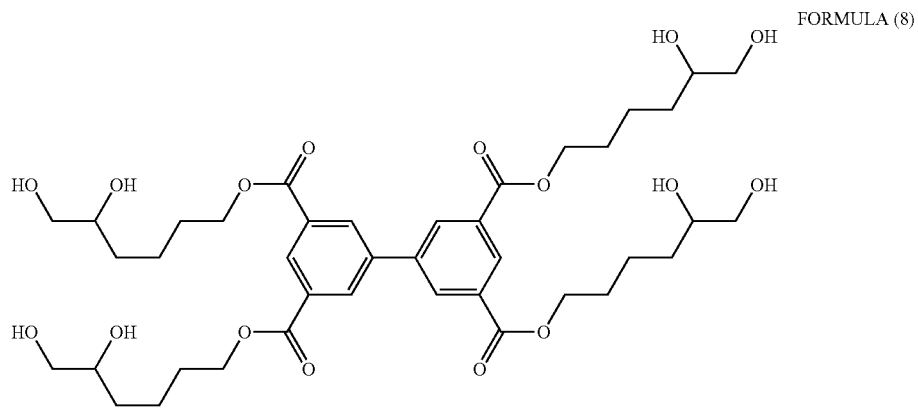

FORMULA (8)

The structure of the product was identified by ¹H-NMR and ¹³C-NMR. The spectroscopic data for the compound are as follows.

¹H NMR (methanol-d⁴, 300 MHz): δ (ppm)=8.20 (s, 2H), 7.93 (s, 4H), 4.96 (brs, 8H), 4.35 (t, J=6.1 Hz, 8H), 3.66 (m, 4H), 3.55-3.47 (m, 8H), 1.86-1.52 (m, 24H).

¹³C NMR (75 MHz, methanol-d⁴): δ (ppm)=166.3, 140.3, 132.7, 132.5, 130.5, 73.2, 67.5, 67.0, 34.2, 30.0, 23.4.

Preparative Example 8

Synthesis of Isophthalate Compound

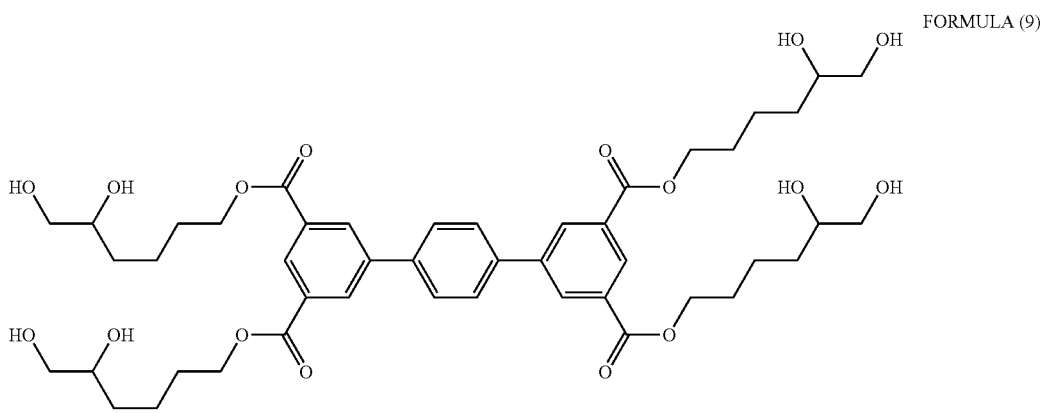

FORMULA (9)

The compound of Formula 9 was prepared in the same manner as in Preparative Example 7 except that the isophthalate compound prepared in Preparative Example 2 was used instead of the isophthalate compound prepared in Preparative Example 1. The structure of the compound of Formula 9 was identified by ¹H-NMR and ¹³C-NMR. The spectroscopic data for the compound of Formula 9 are as follows.

¹H NMR (methanol-d₄, 300 MHz): δ (ppm)=8.19 (s, 2H), 7.63 (s, 4H), 7.62 (d, J=7.1 Hz, 4H), 4.81 (brs, 8H), 4.24 (t, J=6.1 Hz, 8H), 3.54 (m, 4H), 3.53-3.46 (m, 8H), 1.76-1.67 (m, 24H).

¹³C NMR (75 MHz, methanol-d⁴): δ (ppm)=165.3, 141.3, 132.7, 132.5, 131.4, 130.7, 72.2, 66.4, 63.0, 32.2, 31.4, 22.4.

Preparative Example 9

Synthesis of Isophthalate Compound

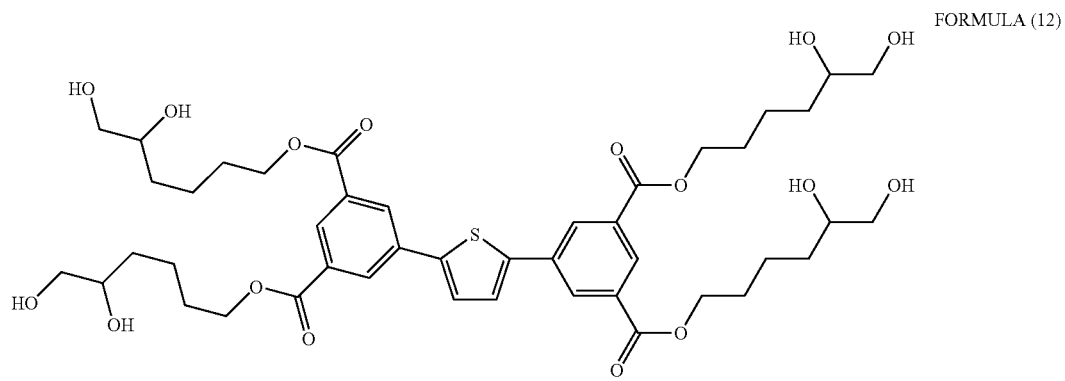

The compound of Formula 12 was prepared in the same manner as in Preparative Example 7 except that the isophthalate compound prepared in Preparative Example 5 was used instead of the isophthalate compound prepared in Preparative Example 1. The structure of the compound of Formula 12 was identified by $^1$H-NMR and $^{13}$C-NMR. The spectroscopic data for the compound of Formula 12 are as follows.

$^1$H NMR (methanol-d$^4$, 300 MHz): δ (ppm)=8.32 (s, 2H), 8.18 (s, 4H), 7.53 (s, 4H), 4.89 (brs, 8H), 4.34 (t, J=6.3 Hz, 8H), 3.63 (m, 4H), 3.55-3.43 (m, 8H), 1.83-1.43 (m, 24H).

$^{13}$C NMR (75 MHz, methanol-d$^4$): δ (ppm)=166.7, 141.9, 139.5, 132.5, 128.5, 73.1, 67.4, 66.7, 34.1, 29.8, 23.3.

Preparative Example 10

Synthesis of Isophthalate Compound

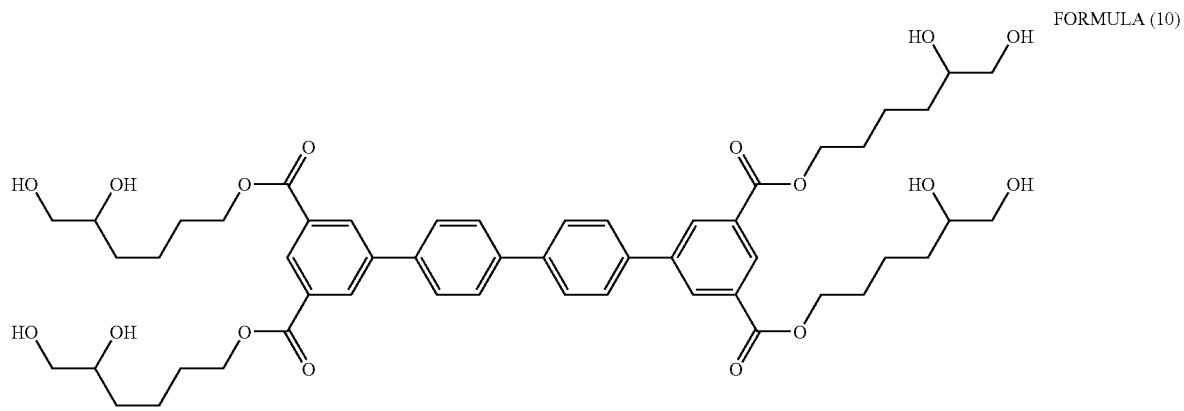

The compound of Formula 10 was prepared in the same manner as in Preparative Example 7 except that the isophthalate compound prepared in Preparative Example 3 was used instead of the isophthalate compound prepared in Preparative Example 1.

Preparative Example 11

Synthesis of Isophthalate Compound

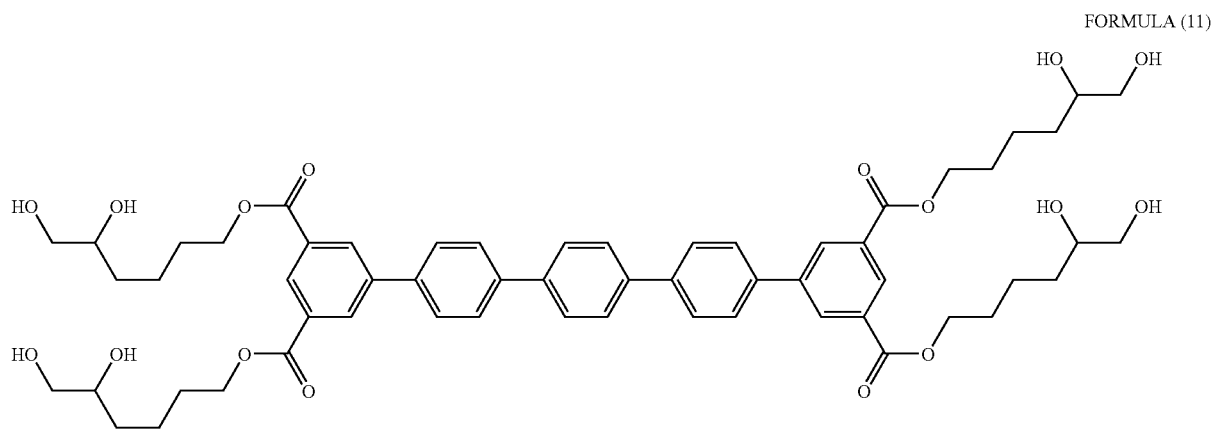

FORMULA (11)

The compound of Formula 11 was prepared in the same manner as in Preparative Example 7 except that the isophthalate compound prepared in Preparative Example 4 was used instead of the isophthalate compound prepared in Preparative Example 1.

Preparative Example 12

Synthesis of Isophthalate Compound

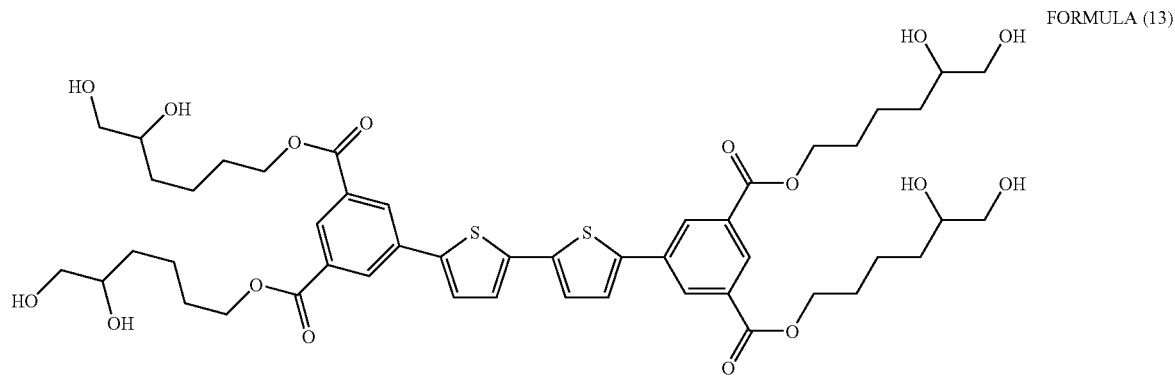

FORMULA (13)

The compound of Formula 13 was prepared in the same manner as in Preparative Example 7 except that the isophthalate compound prepared in Preparative Example 6 was used instead of the isophthalate compound prepared in Preparative Example 1.

Fabrication of Electrochromic Devices

Examples 1-6

Each of the electrochromic materials prepared in Preparative Examples 1-6 was dissolved in N-methylpyrrolidone solution containing 0.2 M dry tetrabutylammonium hexafluorophosphate to prepare a 0.225 M electrochromic solution. Subsequently, spacers were disposed between two ITO-coated glass substrates to maintain a cell gap, followed by sealing of an internal chamber formed between the two ITO-coated glass substrates. The electrochromic solution was injected into the cell via syringe to fabricate an electrochromic test device.

Examples 7-9

0.25 g of a powder of $TiO_2$ nanoparticles having an average particle size of 12 nm, 0.060 g of carbowax, 0.5 mL of terpineol and 0.5 mL of ethanol were mixed together to obtain a paste. The paste was patterned on two ITO transparent electrodes to form films. The films were sequentially annealed at 150° C. for one hour and then 450° C. for 2 hours to form $TiO_2$ nanocrystal layers.

Subsequently, each of the electrochromic materials prepared in Preparative Examples 7-9 was dissolved in methanol. One of the $TiO_2$-coated ITO glass electrodes was dipped in the solution. After one day, the ITO electrode was washed with methanol and heated for 30 min to form an electrochromic layer.

Meanwhile, the other $TiO_2$-coated ITO glass electrode was dipped in a solution of the ferrocene compound (0.1 g) of Formula 14 in THF (5 mL) at room temperature for 12 hr to adsorb the ferrocene compound thereon. The resulting ITO electrode was washed with methanol to clean its surface, and dried at room temperature to form an electron transport layer.

Then, spacers were disposed between the TiO$_2$-coated ITO transparent electrode adsorbed with the electrochromic material and the TiO$_2$-coated ITO electrode adsorbed with the ferrocene compound to maintain a cell gap. Thereafter, a solution of 0.2 M tetrabutylammonium hexafluorophosphate in N-methylpyrrolidone as an electrolyte was injected into between the electrochromic layer and the electron transport layer, and sealed to fabricate an electrochromic device.

Characterization of Electrochromic Materials and Electrochromic Devices

The electrochemical properties of the electrochromic materials prepared in Preparative Examples 1-6 were evaluated by cyclic voltammetry (CV). In the CV experiments, a standard CV experiment cell consisting of 3 electrodes, which include ITO as the working electrode, platinum as the counter electrode, and an Ag/AgNO$_3$ electrode as the reference electrode. These three electrodes are placed in the electrolyte solution and CV experiments are conducted. The CV experiments provide reduction and oxidation voltage data for the compounds. The results are shown in Table 1.

TABLE 1

| Electrochromic material | First reduction potential (V) | Second reduction potential (V) |
|---|---|---|
| Preparative Example 1 | −2.24 | −2.48 |
| Preparative Example 2 |  | −2.46 |
| Preparative Example 3 |  | −2.36 |
| Preparative Example 4 |  | −2.36 |
| Preparative Example 5 | −2.06 | −2.36 |
| Preparative Example 6 | −2.18 | −2.49 |
| Ferrocene | +0.06 |  |

Changes in the color of the electrochromic devices fabricated in Examples 1-6 were observed when 4.5 volts were applied to the devices. The results are shown in Table 2.

TABLE 2

| Example No. | Color |
|---|---|
| Example 1 | Red |
| Example 2 | Violet |
| Example 3 | Blue |
| Example 4 | Blue |
| Example 5 | Blue |
| Example 6 | Bluish green |

As apparent from the results in Table 2, the electrochromic devices of Examples 1-6, each of which includes an electrochromic layer in the form of a solution or gel formed using the corresponding novel isophthalate compound, produced various colors, e.g., red as well as blue and violet colors.

Figure 3:
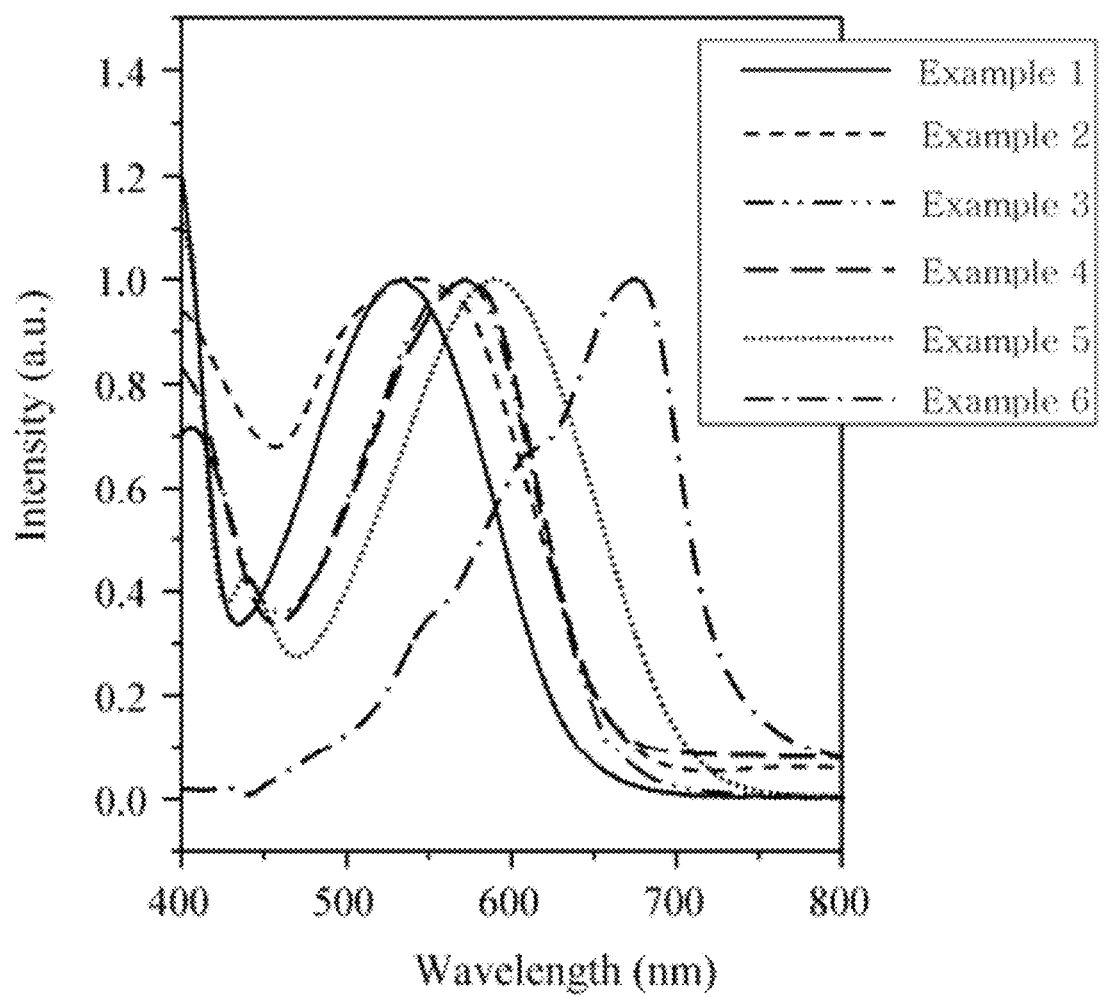
FIG. 3 shows UV spectra of constituent electrochromic materials of exemplary embodiments of electrochromic devices fabricated according to Examples 1 to 6 after the colors of the devices were changed in response to voltages applied to the devices.

After a voltage was applied to each of the electrochromic devices fabricated in Examples 1-6 to change the color of the device, a UV spectrum of the constituent electrochromic material of the device was obtained using a spectrometer (USB4000, Ocean Optics). The results are shown in FIG. 3. The spectra of FIG. 3 reveal that the constituent electrochromic materials of the devices fabricated in Examples 1-6 showed absorption peaks at wavelengths of 533 nm, 542 nm, 572 nm, 573 nm, 590 nm and 674 nm, respectively, corresponding to red, violet, blue, blue, blue, bluish green colors.

Figure 4:
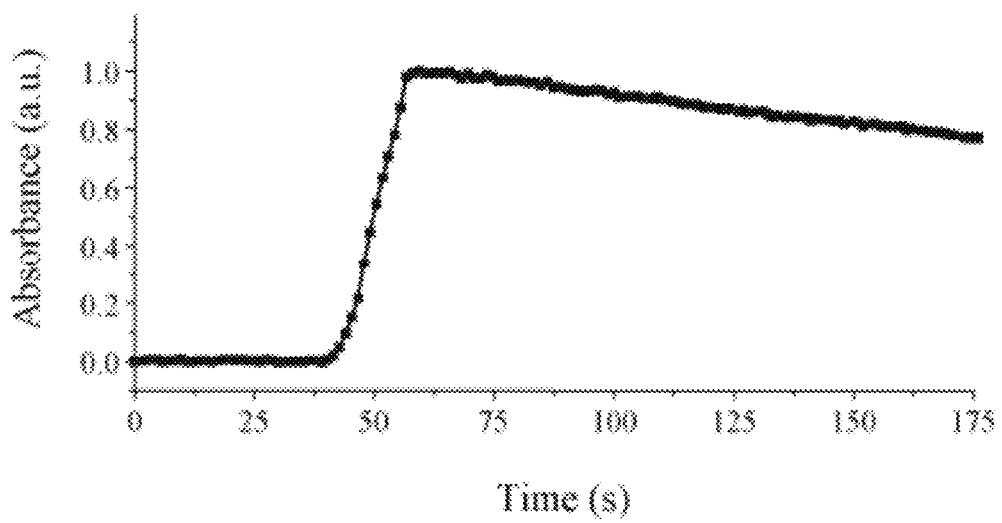
FIG. 4 is a graph showing changes in the absorbance of an exemplary embodiment of an electrochromic device fabricated according to Example 1 as a function of time after the color of the device was changed in response to a voltage applied to the device and the application of the voltage was stopped.

A voltage of −3.2 V was applied to the electrochromic device of Example 1 to change the color of the electrochromic layer of the device and was then removed. Thereafter, changes in the absorbance of the device were observed over time using a spectrometer (USB4000, Ocean Optics). The results are shown in FIG. 4. Referring to the graph of FIG. 4, the electrochromic properties of the electrochromic material were substantially maintained constant, i.e. good image memory, despite the removal of the voltage. In addition, the electrochromic properties of the electrochromic material remained unchanged in a neutral state before voltage application. These results indicate good bistability of the electrochromic material.

Figure 5:
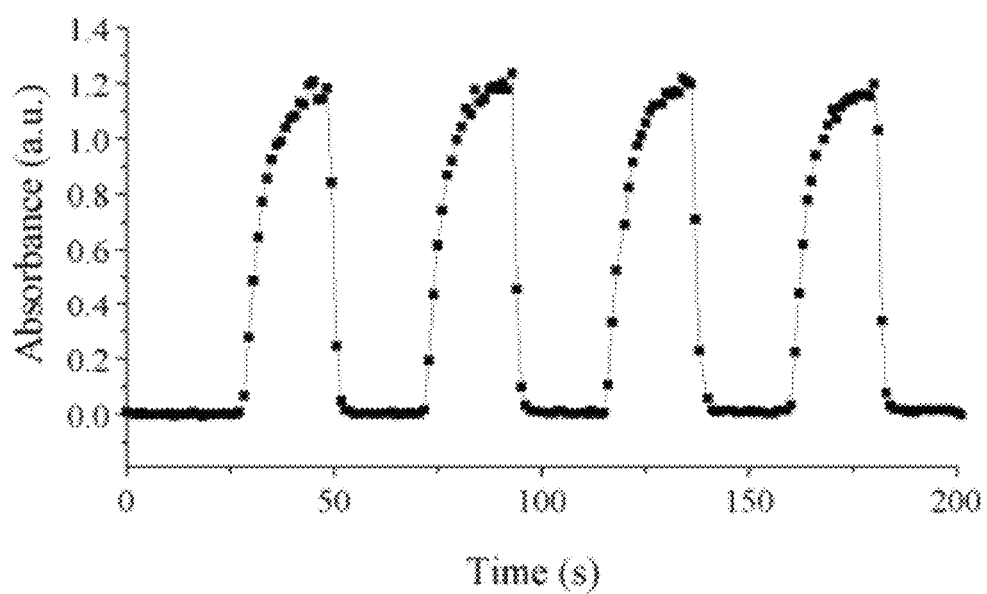
FIG. 5 is a graph showing changes in the absorbance of an exemplary embodiment of an electrochromic device fabricated according to Example 1 as a function of time when voltages of opposite polarities were alternately applied to the device.

When negative and positive voltages (−3.2 and +1.0 V) were alternately applied to the electrochromic device of Example 1 at each 22-sec interval, the time-dependent absorbance changes of the electrochromic device were observed using a spectrometer (USB4000, Ocean Optics) and are shown in FIG. 5. The graph of FIG. 5 demonstrates that the color changes of the electrochromic device were reversible in response to the applied voltages.

Figure 6:
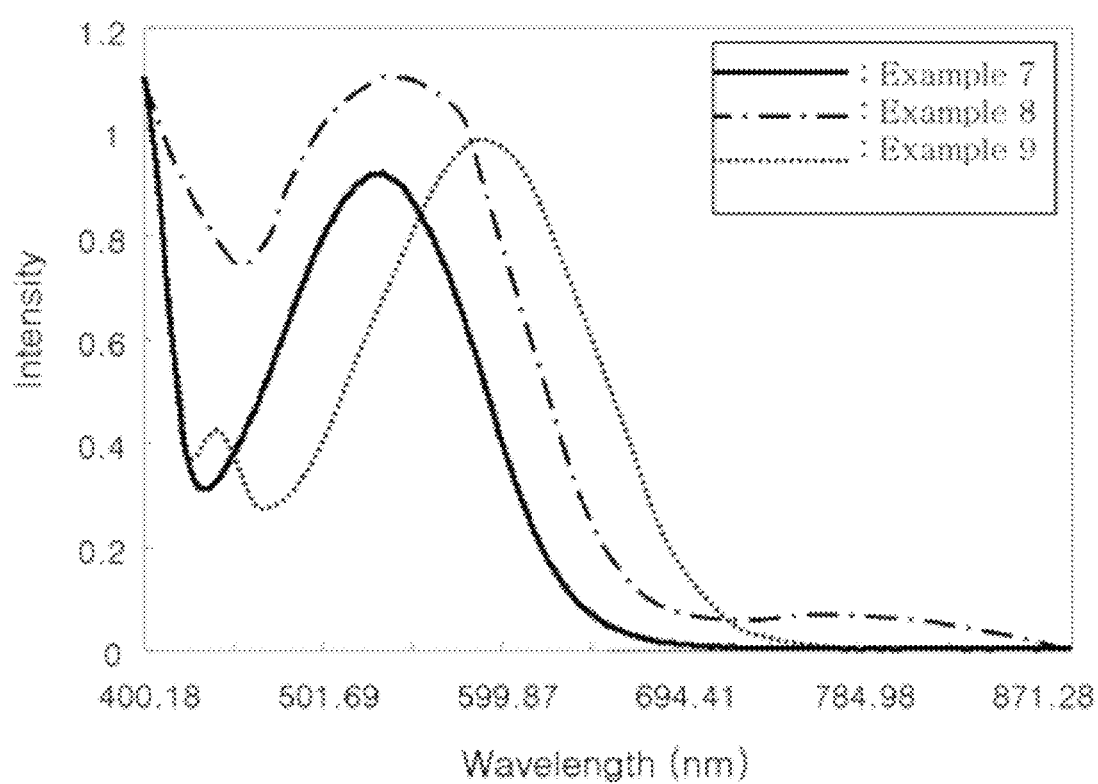
FIG. 6 shows UV spectra of constituent electrochromic materials of exemplary embodiments of electrochromic devices fabricated according to Examples 7 to 9 after the colors of the devices were changed in response to voltages applied to the devices.

After a voltage was applied to each of the electrochromic devices fabricated in Examples 7-9, a UV spectrum of the constituent electrochromic material of the device was obtained using a spectrometer (USB4000, Ocean Optics) to measure the changes in the optical properties of the devices. The results are shown in FIG. 6. The spectra of FIG. 6 reveal that the constituent electrochromic materials of the devices fabricated according to Examples 7-9 showed absorption peaks at wavelengths of 533 nm, 542 nm and 590 nm respectively, corresponding to red, violet and blue colors.

The electrochromic materials prepared in Preparative Examples 10, 11, 12 were used to observe changes in the color of the electrochromic devices which was prepared with the same manner as in Examples 7-9. It is evident that changes of color observed by naked eyes were similar to the result of device properties from the Preparative Examples 3, 4, 6.

Although exemplary embodiments have been described herein with reference to the foregoing preferred embodiments, those skilled in the art will appreciate that various modifications and changes are possible without departing from the spirit of the exemplary embodiments as disclosed in the accompanying claims. Therefore, it is to be understood that such modifications and changes are encompassed within the scope of the exemplary embodiments.

What is claimed is:

1. An electrochromic material comprising a compound of Formula 1:

FORMULA (1)

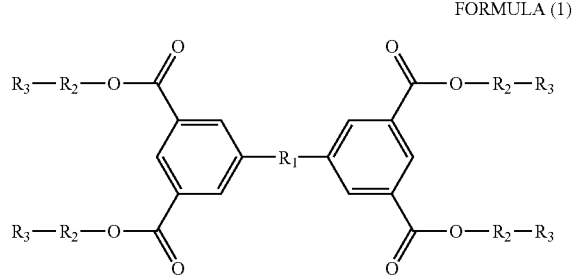

wherein R$_1$ is selected from the group consisting of a single bond, a C$_6$-C$_{50}$ aryl group which is unsubstituted or substituted with at least one group selected from halo, hydroxyl, amino, cyano, nitro, thienyl, C$_1$-C$_7$ alkyl and C$_2$-C$_7$ alkenyl, a C$_5$-C$_{50}$ heteroaryl group which is unsubstituted or substituted with at least one group selected from halo, hydroxyl, amino, cyano, nitro, thienyl, C$_1$-C$_7$ alkyl and C$_2$-C$_7$ alkenyl, a thienyl group, a bithienyl group, a C$_2$-C$_{20}$ alkenyl group conjugated with at least one heteroatom selected from S and O or with the isophthalate groups at both ends thereof, a C$_2$-C$_{20}$ alkynyl group, a $C_3$-$C_{20}$ alkenylalkyl group, a $C_3$-$C_{20}$ alkynylalkyl group and a $C_4$-$C_{20}$ alkenylalkynyl group, wherein each $R_2$ is independently —$(CH_2)_m$—, wherein m is an integer from 1 to 10, and wherein each $R_3$ is independently selected from the group consisting of —CH=$CH_2$, a $C_1$-$C_{10}$ linear, branched or cyclic alkyl group and a $C_2$-$C_{10}$ linear or branched alkenyl group.

2. The electrochromic material of claim 1, wherein $R_1$ is selected from the group consisting of a single bond, a phenyl group, a biphenyl group, a terphenyl group, a thienyl group and a bithienyl group.

3. The electrochromic material of claim 1, wherein the electrochromic material is selected from the group consisting of at least one of the compounds represented by Formulas 2, 3, 4, 5, 6, and 7, wherein the Formulas 2-7 are:

FORMULA (2)

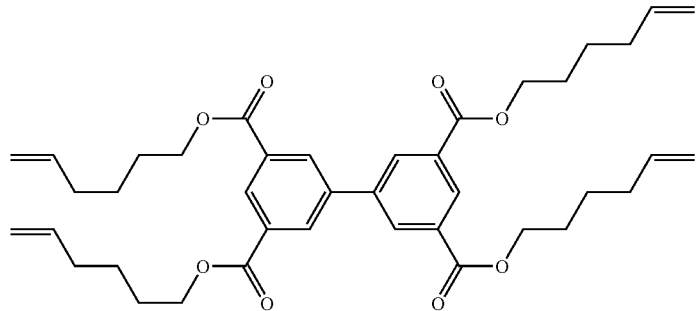

FORMULA (3)

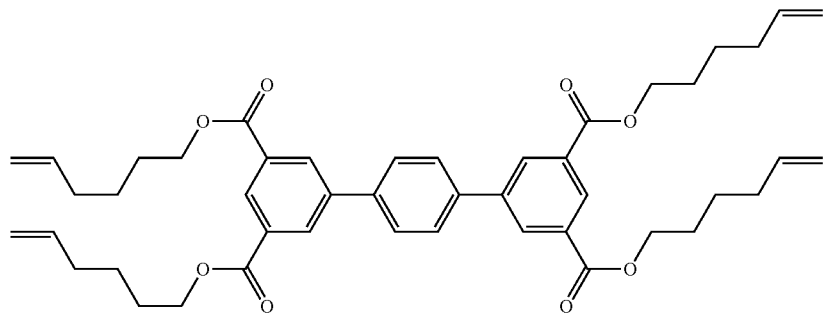

FORMULA (4)

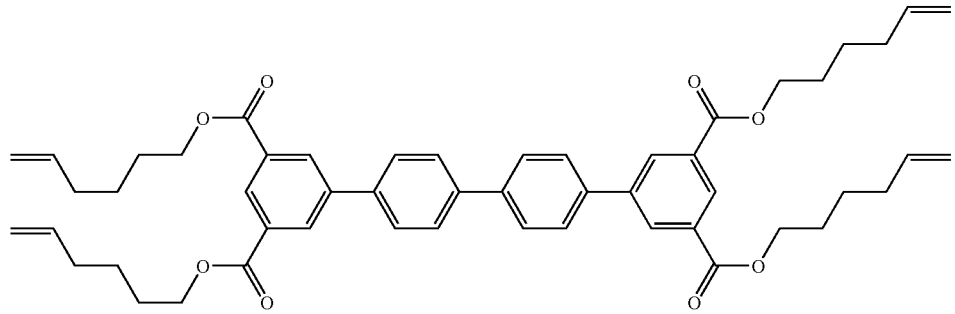

FORMULA (5)

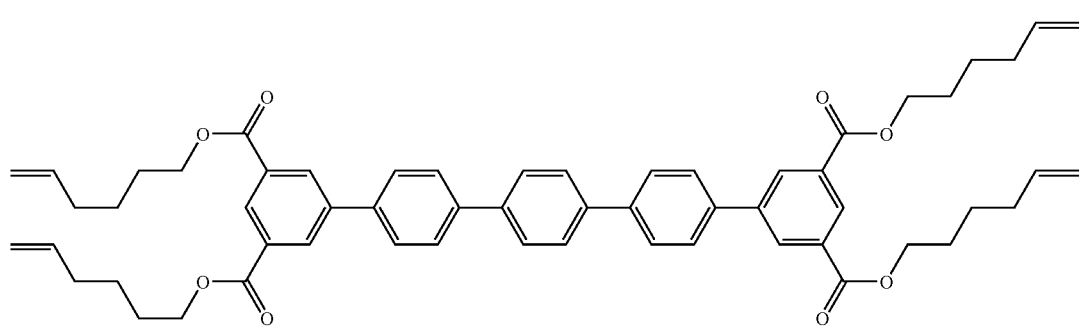

-continued
FORMULA (6)
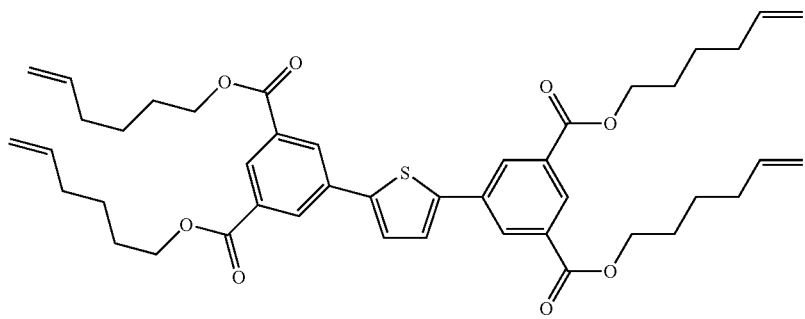
FORMULA (7)
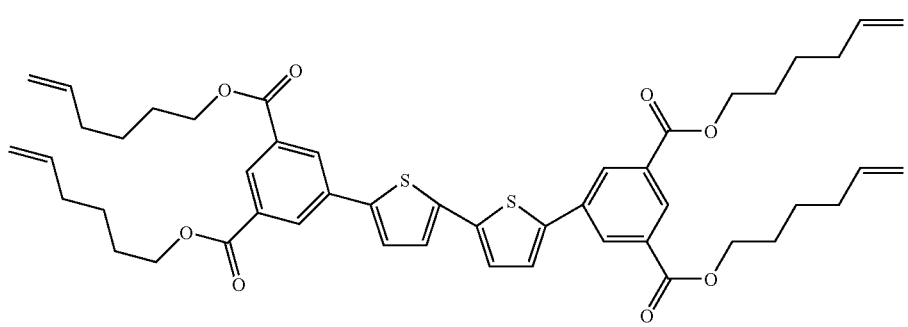
FORMULA (8)
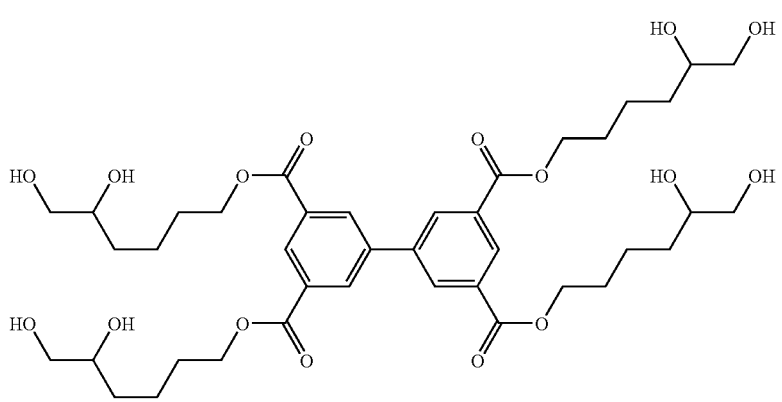
FORMULA (9)
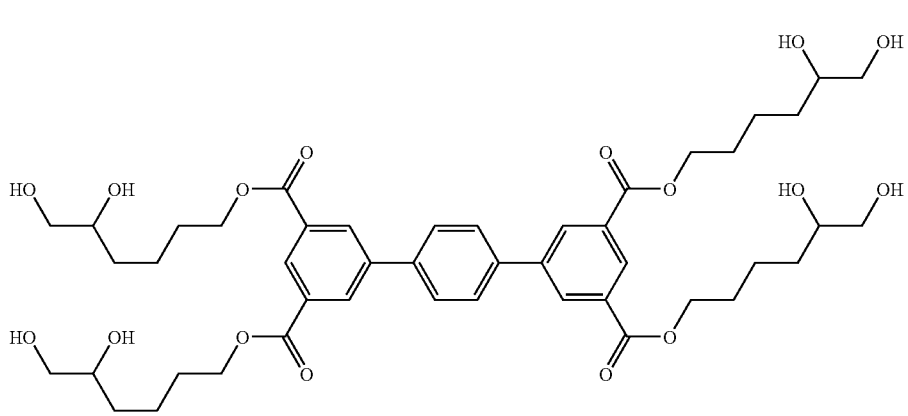

-continued
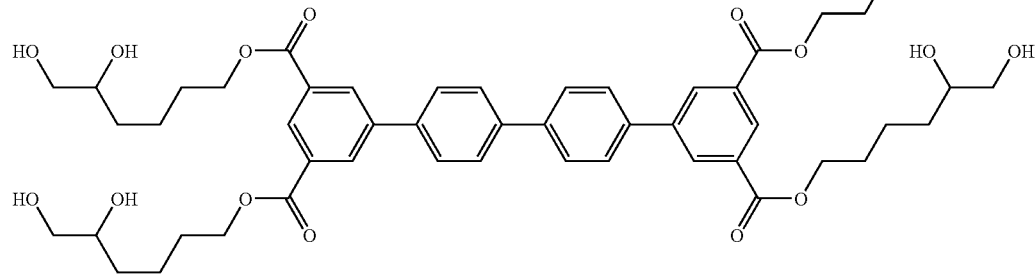
FORMULA (10)
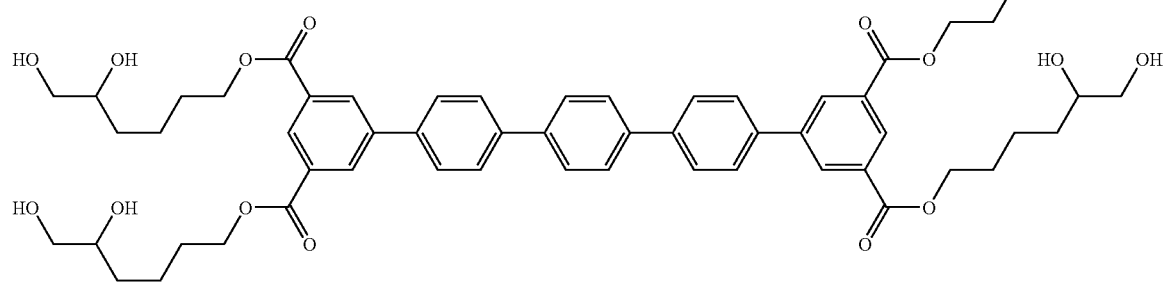
FORMULA (11)
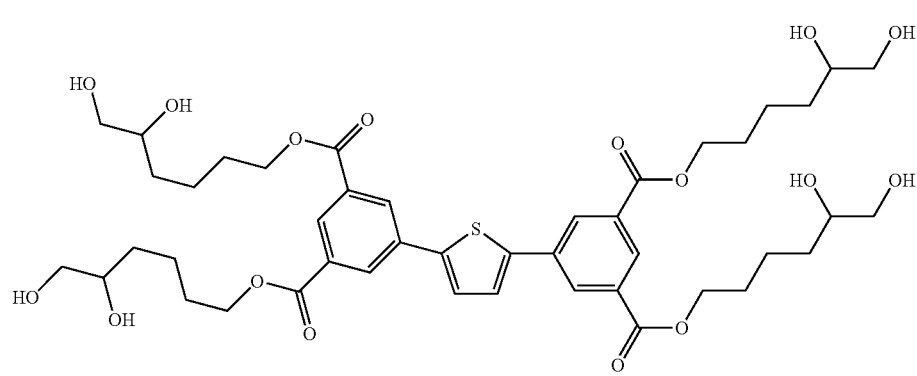
FORMULA (12)
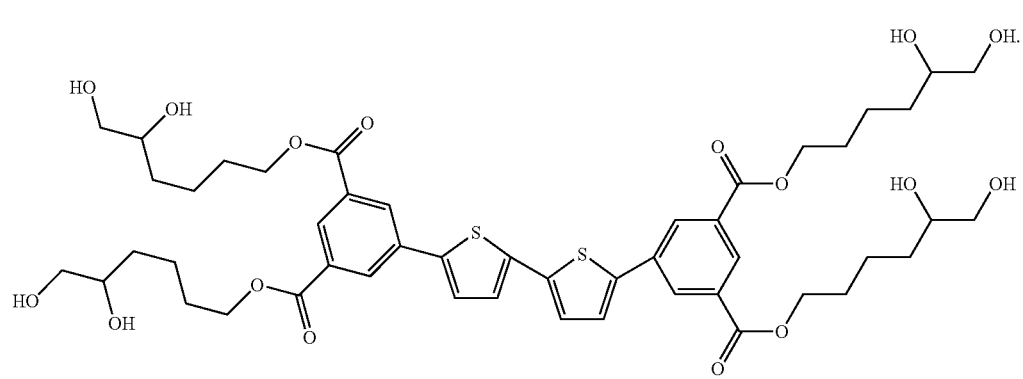
FORMULA (13)

4. An electrochromic device comprising:
a transparent electrode;
an opposite electrode disposed substantially opposite to the transparent electrode; and
an electrochromic layer interposed between the transparent electrode and the opposite electrode,
wherein the electrochromic layer contains the electrochromic material of claim 1.

5. The electrochromic device of claim 4, wherein the transparent electrode comprises a substrate and a conductive film, the opposite electrode comprises a substrate and a conductive film, nanocrystal layers composed of nanocrystal particles on the conductive films, an electrochromic layer formed on one of the nanocrystal layers, an electron transport layer formed on the other nanocrystal layer, and an electrolyte layer formed between the electrochromic layer and the electron transport layer.

6. The electrochromic device of claim 5, wherein the electron transport layer is formed by adsorbing, coating, supporting or attaching the nanocrystal particles of the nanocrystal layer formed on the opposite electrode with the compound of Formula 14:

FORMULA (14)

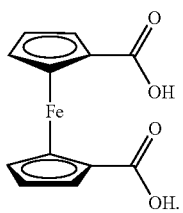

7. The electrochromic device of claim 6, wherein the nanocrystal particles are at least one selected from the group consisting of titanium dioxide (TiO$_2$), zinc oxide (ZnO) and tungsten oxide (WO$_3$) nanocrystal particles.

8. The electrochromic device of claim 4, wherein the electrochromic device displays a red color in response to a voltage applied thereto when the device contains the electrochromic material of Formula 2:

FORMULA (2)

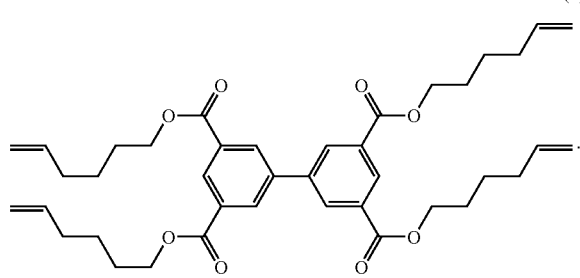

9. The electrochromic device of claim 4, wherein the electrochromic device displays a violet color in response to a voltage applied thereto when the device contains the electrochromic material of Formula 3:

FORMULA (3)

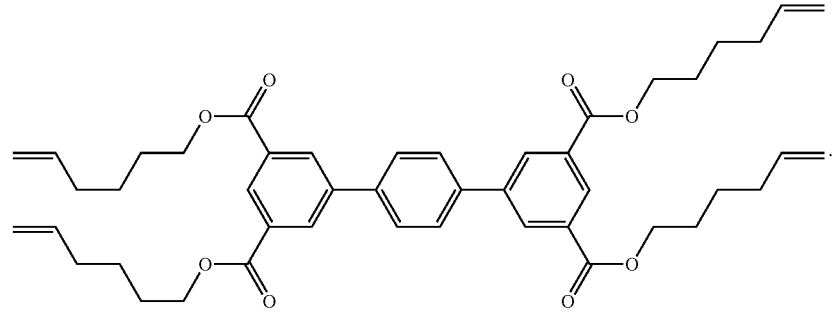

10. The electrochromic device of claim 4, wherein the electrochromic device displays a blue color in response to a voltage applied thereto when the device contains the electrochromic material of Formula 4:

FORMULA (4)

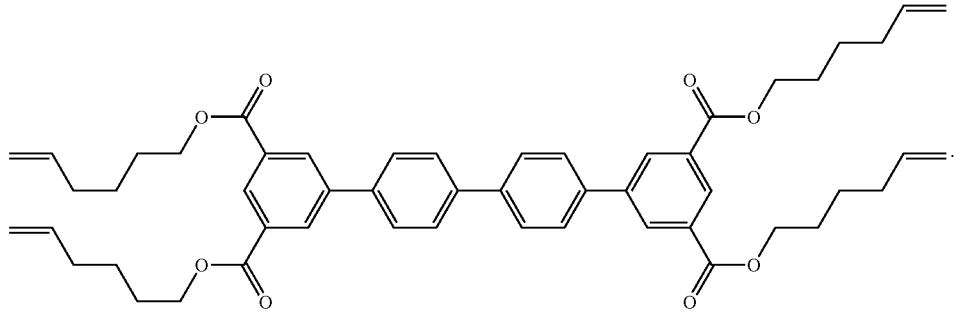

11. The electrochromic device of claim 4, wherein the electrochromic device displays a blue color in response to a voltage applied thereto when the device contains the electrochromic material of Formula 5:

FORMULA (5)

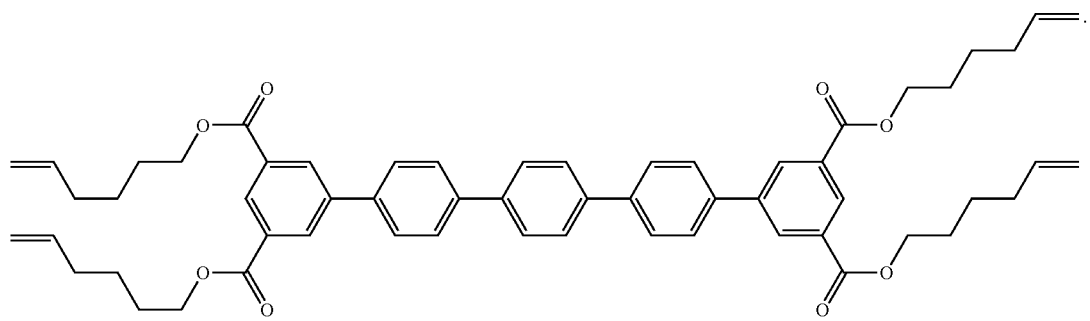

12. The electrochromic device of claim 4, wherein the electrochromic device displays a blue color in response to a voltage applied thereto when the device contains the electrochromic material of Formula 6:

FORMULA (6)

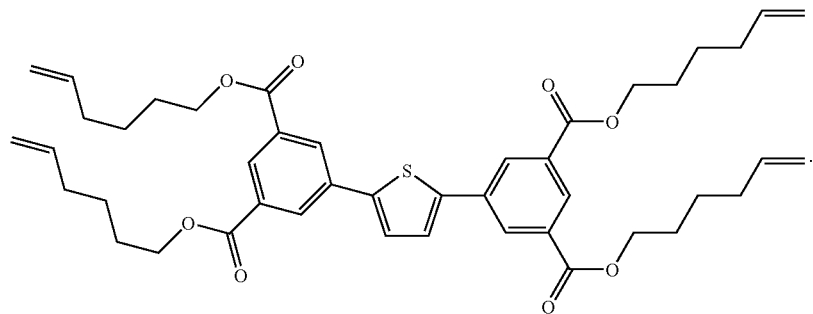

13. The electrochromic device of claim 4, wherein the electrochromic device displays a bluish green color in response to a voltage applied thereto when the device contains the electrochromic material of Formula 7:

FORMULA (7)

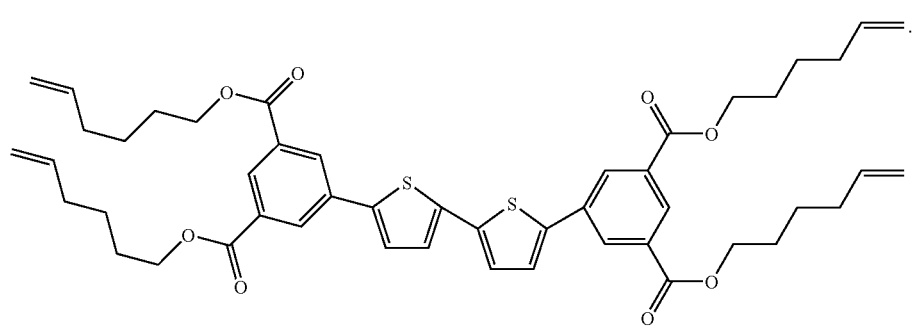

* * * * *